(12) United States Patent
Tomizawa et al.

(10) Patent No.: US 11,668,936 B2
(45) Date of Patent: *Jun. 6, 2023

(54) HEAD-MOUNTED TYPE DISPLAY DEVICE AND METHOD OF CONTROLLING HEAD-MOUNTED TYPE DISPLAY DEVICE

(71) Applicant: SEIKO EPSON CORPORATION, Tokyo (JP)

(72) Inventors: Takashi Tomizawa, Chiisagata-gun (JP); Fumiya Hori, Ueda (JP); Yuichi Kakizaki, Ueda (JP)

(73) Assignee: SEIKO EPSON CORPORATION, Tokyo (JP)

( * ) Notice: Subject to any disclaimer, the term of this patent is extended or adjusted under 35 U.S.C. 154(b) by 67 days.

This patent is subject to a terminal disclaimer.

(21) Appl. No.: 16/995,936

(22) Filed: Aug. 18, 2020

(65) Prior Publication Data
US 2020/0379261 A1 Dec. 3, 2020

Related U.S. Application Data

(63) Continuation of application No. 16/218,626, filed on Dec. 13, 2018, now Pat. No. 10,782,531.

(30) Foreign Application Priority Data

Dec. 14, 2017 (JP) .............................. JP2017-239265

(51) Int. Cl.
*G02B 27/01* (2006.01)
*G06T 19/00* (2011.01)
(Continued)

(52) U.S. Cl.
CPC ..... *G02B 27/0172* (2013.01); *G02B 27/0179* (2013.01); *G06F 3/011* (2013.01);
(Continued)

(58) Field of Classification Search
CPC .............. G06T 19/006; G02B 27/0172; G02B 27/0179; G02B 2027/0138;
(Continued)

(56) References Cited

U.S. PATENT DOCUMENTS 8,327,279 B2 12/2012 Yamamoto et al.
8,570,242 B2 10/2013 Chosokabe et al.
(Continued)

FOREIGN PATENT DOCUMENTS

| JP | 2014-071812 A | 4/2014 |
| JP | 2014-095903 A | 5/2014 |
| WO | 2006/064655 A1 | 6/2006 |

OTHER PUBLICATIONS

Dec. 19, 2019 Office Action issued in U.S. Appl. No. 16/218,626.
Jun. 10, 2020 Notice of Allowance issued in U.S. Appl. No. 16/218,626.

*Primary Examiner* — Yaron Cohen
(74) *Attorney, Agent, or Firm* — Oliff PLC

(57) ABSTRACT

An HMD includes an image display unit configured to display objects in a display region (VR) overlapping with outside scenery; a storage unit configured to store a process flow data to be used for selecting the objects to be displayed in the display region (VR); and a control unit configured to select any of the objects to be displayed in the display region (VR), based on the selection information, and to control display positions of the objects in a depth direction of the display region (VR) so that a display position of a selected object is different from a display position of another object to be displayed in the display region (VR).

12 Claims, 19 Drawing Sheets

(51) Int. Cl.
*G06F 3/01* (2006.01)
*G06F 3/04815* (2022.01)

(52) U.S. Cl.
CPC ........ *G06F 3/04815* (2013.01); *G06T 19/006* (2013.01); *G02B 2027/014* (2013.01); *G02B 2027/0178* (2013.01)

(58) Field of Classification Search
CPC ...... G02B 2027/0178; G02B 2027/014; G02B 2027/0187; G02B 2027/0185; G02B 2027/0134; G06F 3/04815; G06F 3/011
See application file for complete search history.

(56) References Cited

U.S. PATENT DOCUMENTS

2014/0320615 A1* 10/2014 Kuribayashi .......... G09G 3/003
348/54
2015/0143283 A1* 5/2015 Noda .................. G02B 27/017
715/784

* cited by examiner

HEAD-MOUNTED TYPE DISPLAY DEVICE AND METHOD OF CONTROLLING HEAD-MOUNTED TYPE DISPLAY DEVICE

CROSS-REFERENCE TO RELATED APPLICATION(S)

This application is a continuation of U.S. application Ser. No. 16/218,626 filed Dec. 13, 2018, which is based on and claims priority under 35 U.S.C. 119 from Japanese Patent Application No. 2017-239265 filed on Dec. 14, 2017. The entire contents of the above applications are incorporated herein by reference.

BACKGROUND

1. Technical Field

The invention relates to a head-mounted type display device and a method of controlling the head-mounted type display device.

2. Related Art

Hitherto, it has been known a head-mounted type display device capable of securing visibility of objects in a case of displaying the objects including characters (for example, refer to JP-A-2014-95903).

In an image display method of a head-mounted type display in JP-A-2014-95903, chromaticity of an image to be displayed is set so that chromaticity of a predetermined region including an observation object viewed through an image display device and the chromaticity of the image to be displayed establish approximate complementary color relationship.

The head-mounted type display device has been considered to be used in various applications. Thus, there is a need to effectively utilize the head-mounted type display device in various applications by effectively utilizing information displayed by the head-mounted type display device. However, even when the head-mounted display device displays the information, a user may miss the displayed information, and thus this leads a problem that the displayed information may not effectively be utilized.

SUMMARY

The present invention has an object to reduce an oversight of information and effectively utilize the information displayed by a head-mounted type display device.

In order to achieve the above-mentioned object, an aspect of the present invention is a head-mounted type display device configured to be mounted on a head of a user and through which outside scenery is visible, the head-mounted type display device including a display unit configured to display objects in a display region overlapping with the outside scenery, a storage unit configured to store selection information to be used for selecting the objects to be displayed in the display region, and a control unit configured to select any of the objects to be displayed in the display region, based on the selection information, and to control display positions of the objects in a depth direction of the display region so that a display position of a selected object is different from a display position of another object to be displayed in the display region.

With this configuration, the selected object can be displayed at a different display position from that of another object in the depth direction. Thus, an oversight of the objects can be reduced, and the information displayed by the head-mounted type display device can effectively be utilized.

In an aspect of the present invention, the control unit is configured to adjust the display positions of the objects in the depth direction by changing a convergence angle between a right eye and a left eye of the user.

With this configuration, the display positions of the objects in the depth direction can easily be adjusted.

In an aspect of the present invention, the control unit is configured to control the display positions of the objects in the depth direction of the display region and display states of the objects.

With this configuration, the display positions and the display states of the objects are controlled. Accordingly, an oversight of the objects can further be reduced, and the information displayed by the head-mounted type display device can effectively be utilized.

In an aspect of the present invention, the control unit is configured to change the display position of the selected object in the depth direction every unit time.

With this configuration, the display position of the selected object in the depth direction can be changed every unit time. Accordingly, an oversight of the objects can further be reduced, and the information displayed by the head-mounted type display device can effectively be utilized.

In an aspect of the present invention, the control unit is configured to change the display position of the selected object in the depth direction, and alternately switch a display state every unit time between a display state in which the selected object is displayed on a user side than another object in the depth direction and a display state in which the selected object is displayed on a far side than another object in the depth direction.

With this configuration, the display position of the selected object in the depth direction can be changed every unit time. Accordingly, an oversight of the objects can further be reduced, and the information displayed by the head-mounted type display device can effectively be utilized.

In an aspect of the present invention, the control unit is configured to change the display position of the selected object about an imaginary axis set in a predetermined direction with the display region as a reference.

With this configuration, the display position of the selected object is changed about the imaginary axis. Thus, an oversight of the objects can further be reduced, and the information displayed by the head-mounted type display device can effectively be utilized.

In an aspect of the present invention, the control unit is configured to set the imaginary axis in a direction parallel with a vertical direction of the display region. The control unit is configured to alternately switch a display state every unit time between a display state in which one end of the selected object in a direction parallel with a horizontal direction of the display region is displayed on a user side in the depth direction than another end in the direction parallel with the horizontal direction of the display region and a display state in which the other end is displayed on a user side than the one end in the depth direction.

With this configuration, the display positions of the one end and the other end of the selected object in the depth direction can be changed every unit time. Thus, an oversight of the objects can further be reduced, and the information displayed by the head-mounted type display device can effectively be utilized.

In an aspect of the present invention, the control unit is configured to alternately switch a display state every unit time between a display state in which a length of the selected object on the one end side is shorter than a length of the selected object on the other end and a display state in which the length of the selected object on the other end side is shorter than the length of the selected object on the one end side.

With this configuration, the lengths of the one end and the other end of the selected object can be changed every unit time. Accordingly, an oversight of the objects can further be reduced, and the information displayed by the head-mounted type display device can effectively be utilized.

In an aspect of the present invention, the control unit is configured to, in a case where the selected object is a character string and the other object includes a character string, change the display state of the selected object so that at least any of a color, boldness, a background color, a font type, and a font size of the character string as the selected object and at least corresponding one of a color, boldness, a background color, a font type, and a font size of the character string of the other object are different from each other.

With this configuration, at least any of a color, boldness, a background color, a font type, and a font size of the character string as the selected object can be changed from that of the other character string. Therefore, the user recognizes the selected character string easily, and an oversight of the information needed for the user can further be reduced with the head-mounted type display device. Thus, the information displayed by the head-mounted type display device can effectively be utilized.

In an aspect of the present invention, the storage unit is configured to store control data defining an operation flow including a plurality of operation steps for which an execution order is set in advance. The control unit is configured to, in a case where the operation flow is executed, switch whether or not to execute control of the display positions of the objects in accordance with setting of the control data regarding the plurality of operation steps.

With this configuration, the display positions of the objects in the depth direction, which are included in the operation flow, can be changed every unit time. Thus, the user can recognize the selected object more easily, and an oversight can further be reduced. Therefore, in a case of using the head-mounted type display device for work support, work of the user can effectively be supported.

In an aspect of the present invention, the control unit is configured to, in a case where a plurality of the objects are selected, cause the selected plurality of objects to be sequentially displayed in the display region.

With this configuration, the plurality of objects can be displayed in an order of selection. Thus, even when the plurality of objects are selected, an oversight of the objects can be reduced, and the information displayed by the head-mounted type display device can effectively be utilized.

In an aspect of the present invention, the control unit is configured to, in a case where a first object and a second object are selected as the plurality of objects, control the display positions of the objects in the display region so that a display state is alternately switched between a first display state in which the first object is displayed on a user side than another object and the second object is displayed on a far side than another object in the depth direction, and a second display state in which the second object is displayed on a user side than another object and the first object is displayed on a far side than another object in the depth direction.

With this configuration, the display states of the first object and the second object can alternately be changed between the first display state and the second display state. Thus, even when the plurality of objects are selected, an oversight of the objects can be reduced, and the information displayed by the head-mounted type display device can effectively be utilized.

In an aspect of the present invention, the control unit is configured to control the display position of the selected object in the display region so that the selected object does not overlap with another object.

With this configuration, the plurality of object are displayed in the display region not to overlap with each other. Accordingly, degradation of visibility of the objects can be prevented.

In an aspect of the present invention, the control unit is configured to select the object including any of a character, an icon, and a frame body surrounding at least any of the character and the icon.

With this configuration, the display positions of the character, the icon, and the frame body surrounding at least any of the character and the icon are controlled. Thus, an oversight of the objects can be reduced, and the information displayed by the head-mounted type display device can effectively be utilized.

In order to achieve the above-mentioned object, an aspect of the present invention is a method of controlling a head-mounted type display device configured to be mounted on a head of a user and through which outside scenery is visible, the method including selecting any of objects to be displayed in a display region overlapping with the outside scenery, based on selection information to be used for selecting the objects, and controlling display positions of the objects in a depth direction of the display region so that a display position of a selected object is different from a display position of another object to be displayed in the display region.

With this configuration, the selected object can be displayed at a different display position from that of another object in the depth direction. Thus, an oversight of the objects can be reduced, and the information displayed by the head-mounted type display device can effectively be utilized.

BRIEF DESCRIPTION OF THE DRAWINGS

The invention will be described with reference to the accompanying drawings, wherein like numbers reference like elements.

DESCRIPTION OF EXEMPLARY EMBODIMENTS

An exemplary embodiment of the invention is described below with reference to the drawings.

Figure 1:
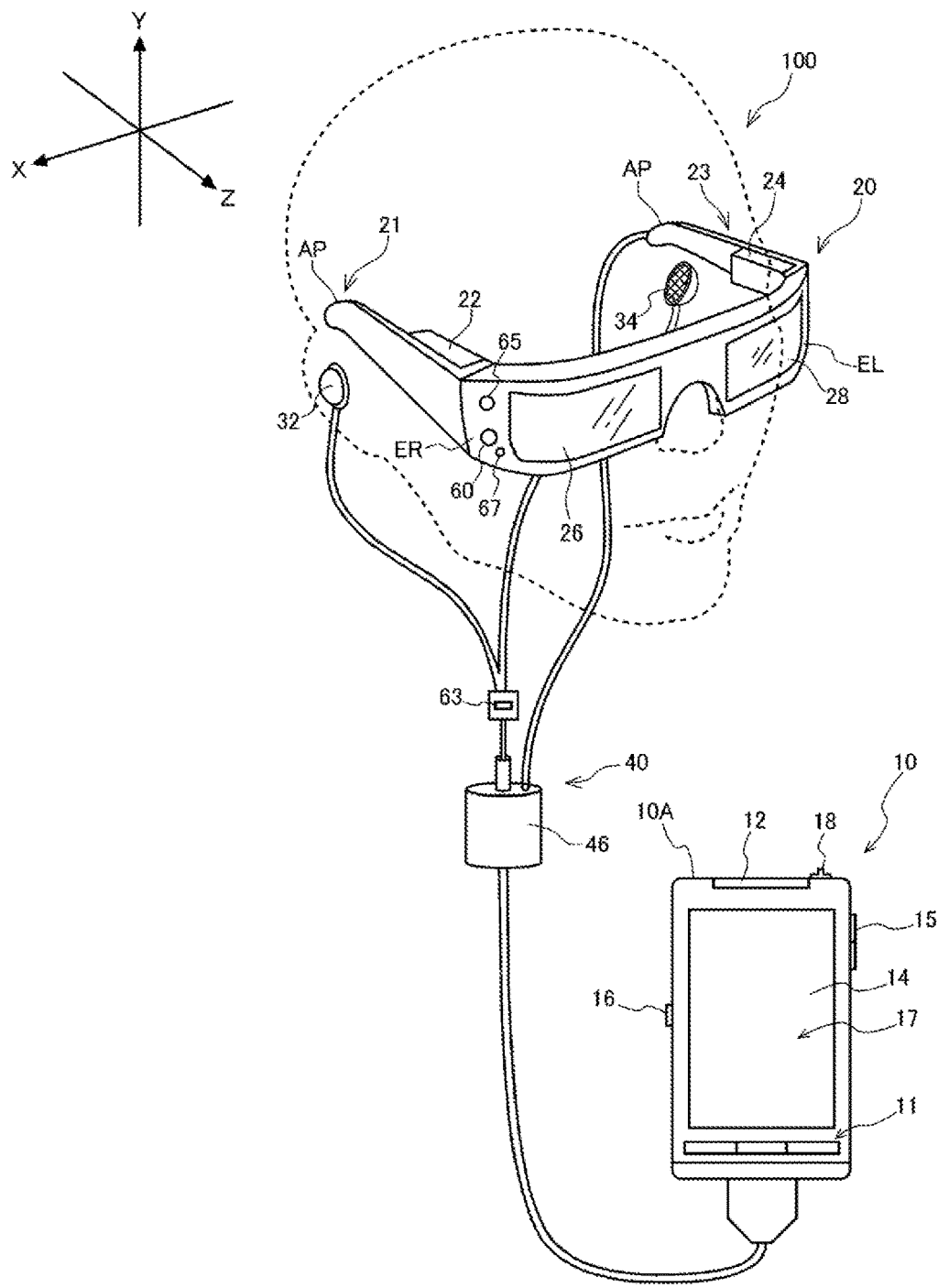
FIG. 1 is a view illustrating an external configuration of an HMD.

FIG. 1 is an explanatory view for illustrating an external configuration of a Head Mounted Display (HMD) 100 to which the present invention is applied. The HMD 100 is a display device including a control device 10 and an image display unit 20. The image display unit 20 corresponds to a "display unit" of the present invention.

The control device 10 includes an operation unit configured to receive an operation by a user, and functions as a controller through which the user operates the HMD 100. The control device 10 receives an operation by the user, and controls the image display unit 20 according to the received operation. The image display unit 20 is mounted on a user's head, and allows the user to visually recognize a virtual image. The user refers to a person with the image display unit 20 mounted on his/her head.

Figure 4:
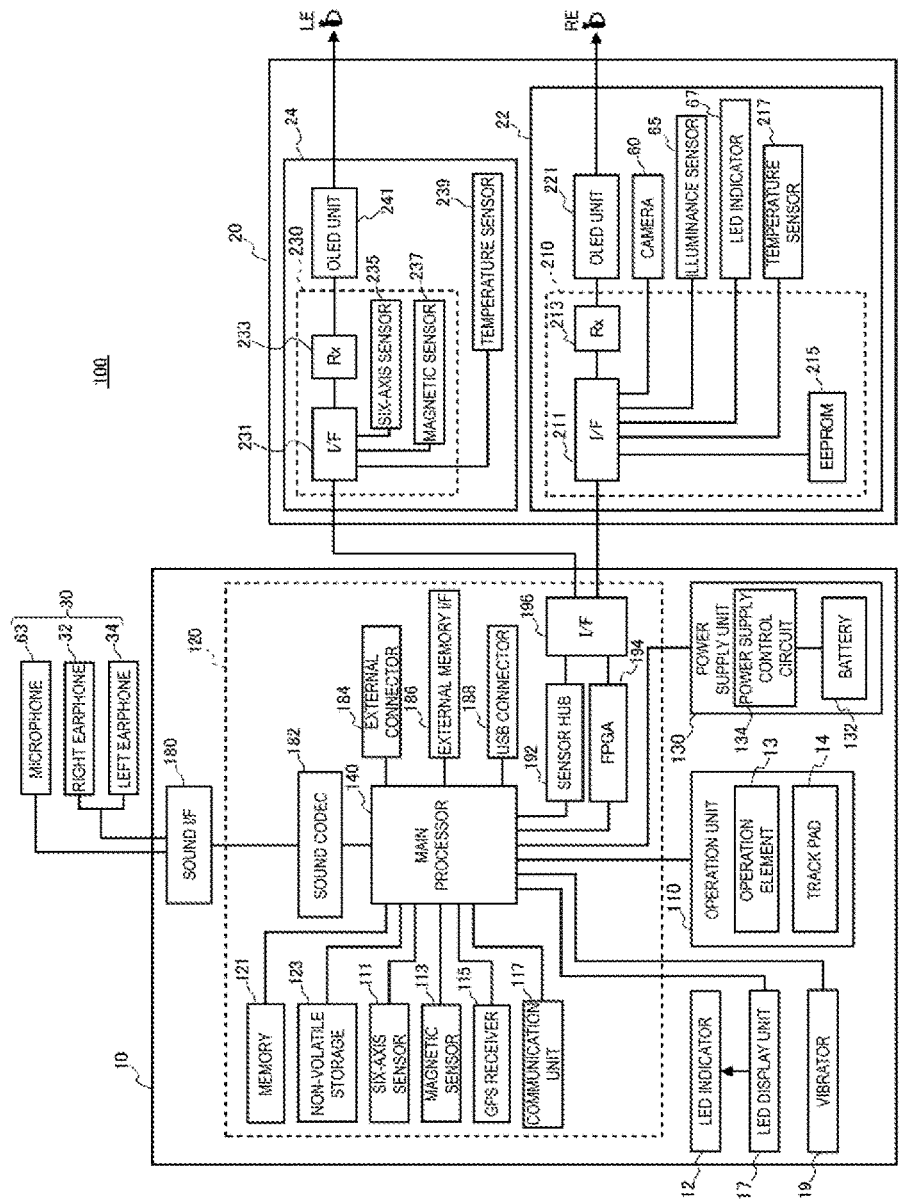
FIG. 4 is a block diagram of the HMD.

As illustrated in FIG. 1, the control device 10 includes a flat box-like case 10Au, which can also be described as a hosing or a main body. The case 10A includes portions such as operation buttons 11, an LED indicator 12, a track pad 14, up and down keys 15, a changeover switch 16, and a power switch 18. The operation buttons 11, the up and down keys 15, the changeover switch 16, and the power switch 18 are collectively referred to as operation elements 13 (FIG. 4). The user can operate the HMD 100 by operating the operation elements 13 and the track pad 14.

The operation buttons 11 includes a menu key, a home key, and a return key, and particularly some of the keys and switches are transformed by a pressing operation. The LED indicator 12 turns on and blinks according to the operation state of the HMD 100.

The track pad 14 includes an operation surface for detecting a contact operation, and outputs an operation signal in response to the operation on the operation surface. As a detection system for detecting operations on the operation surface of the track pad 14, various detection systems such as an electrostatic type and an optical type can be employed.

The up and down keys 15 are used for instruction inputting of increasing or reducing volume of sound output from a right earphone 32 and a left earphone 34 and for instruction inputting of increasing or reducing brightness of display of the image display unit 20. The changeover switch 16 is a switch for changing over inputting corresponding to operations of the up and down keys 15. The power switch 18 is a switch for changing over an on-state and an off-state of power of the HMD 100, and is formed of, for example, a slide switch.

The image display unit 20 is a head-mounted body to be worn on the user's head and has an eyeglasses-like shape in the exemplary embodiment. The image display unit 20 includes a main body including a right holding part 21, a left holding part 23, and a front frame 27, and further includes, on the main body, a right display unit 22, a left display unit 24, a right light guide plate 26, and a left light guide plate 28.

The right holding part 21 and the left holding part 23 extend rearward from respective ends of the front frame 27, to hold the image display unit 20 on the user's head like temples of eyeglasses. Here, an end ER refers to one of the opposite ends of the front frame 27 positioned on the user's right side in a state where the image display unit 20 is mounted on the user. An end EL refers to the other end positioned on the user's left side in the mounted state. The right holding portion 21 is provided to extend from the end ER of the front frame 27 to a position corresponding to the right side of the user's head in the state where the image display unit 20 is mounted on the user. The left holding portion 23 is provided to extend from the end EL to a position corresponding to the left side of the user's head in the state where the image display unit 20 is mounted on the user.

The right light guiding plate 26 and the left light guiding plate 28 are provided in the front frame 27. The right light guide plate 26 is positioned in front of the user's right eye in the state where the image display unit 20 is mounted on the user, to allow the right eye to visually recognize an image. The left light guide plate 28 is positioned in front of the user's left eye in the state where the image display unit 20 is mounted on the user, to allow the right eye to visually recognize an image.

The front frame 27 is shaped to couple one end of the right light guide plate 26 and one end of the left light guide plate 28 together, and the coupling position between the right light guide plate 26 and the left light guide plate 28 corresponds to a position of the user's glabella in the state where the image display unit 20 is mounted on the user. The front frame 27 may include a nose pad part provided at the coupling position between the right light guide plate 26 and the left light guide plate 28, the nose pad part abutting on the user's nose in the state where the image display unit 20 is mounted on the user. In this case, the nose pad part, the right holding part 21, and the left holding part 23 allow the image display unit 20 to be held on the user's head. A belt (not illustrated) may also be coupled to the right holding portion 21 and the left holding portion 23 to contact the back of the user's head in the state where the image display unit 20 is mounted on the user. In this case, the belt allows the image display unit 20 to be held on the user's head.

The right display unit 22 enables images to be displayed through the right light guiding plate 26. The right display unit 22 is provided on the right holding part 21, and positioned near the right side region of the user's head in the state where the image display unit 20 is mounted on the user. The left display unit 24 enables images to be displayed through the left light guiding plate 28. The left display unit 24 is provided on the left holding part 23, and positioned near the left side region of the user's head in the state where the image display unit 20 is mounted on the user.

Each of the right light guiding plate 26 and the left light guiding plate 28 is an optical part made of light transmissive resin and the like, and is formed of, for example, a prism.

The right light guiding plate 26 and the left light guiding plate 28 guide image light output from the right display unit 22 and the left display unit 24 to the eyes of the user.

Surfaces of the right light guiding plate 26 and the left light guiding plate 28 may be provided with dimmer plates (not illustrated). The dimmer plates are optical elements on a thin plate, having a different transmittance for a different wavelength range of light, and function as so-called wavelength filters. The dimmer plates are, for example, arranged so as to cover a front side of the front frame 27, which is a side opposite to the side of the user's eyes. Appropriate selection of optical characteristics of the dimmer plates allows adjustment of transmittance of light with an arbitrary wavelength region such as visible light, infrared light, or ultraviolet light and allows adjustment of the amount of outside light entering the right light guide plate 26 and the left light guide plate 28 from outside and passing through the right light guide plate 26 and the left light guide plate 28.

The image display unit 20 is a transmissive display device for causing the outside light to pass through the image display unit 20 to thereby allow outside scenery to be visually recognized. The image display unit 20 guides the image light generated in the right display unit 22 and the image light generated in the left display unit 24 to the right light guiding plate 26 and the left light guiding plate 28, respectively. The image light guided by the right light guiding plate 26 and the image light guided by the left light guiding plate 28 enter the right eye and the left eye of the user, respectively, to allow the user to visually recognize a virtual image. In this manner, the image display unit 20 displays an image. In a visual field range FV of the user wearing the image display unit 20 on his/her head, a region in which the image display unit 20 can display an image is referred to as a display region VR. The display region VR is superimposed on outside scenery, and the user can visually recognize the object displayed by the image display unit 20 and the outside scenery at the same time. The object will be described later in detail.

In a case where the outside light travels from the front side of the user passes through the right light guiding plate 26 and the left light guiding plate 28 and enters the eyes of the user, image light forming a virtual image and the outside light enters the eyes of the user. Thus, visibility of a visual image is affected by intensity of the outside light. For this reason, the visibility of a visual image can be adjusted, for example, by installing the dimmer plates on the front frame 27 and appropriately selecting or adjusting the optical characteristics of the dimmer plates. In a typical example, the dimmer plate having a light transmissivity sufficient to allow the user wearing the HMD 100 to visually recognize at least the outside scenery may be used. The use of the dimmer plates is also expected to be effective for protecting the right light guide plate 26 and the left light guide plate 28 to suppress, e.g., damage and adhesion of stains to the right light guide plate 26 and the left light guide plate 28. The dimmer plates may be detachable from the front frame 27 or each of the right light guiding plate 26 and the left light guiding plate 28. A plurality of types of dimmer plates may be mountable to selectively install any of the dimmer plates by replacement. The image display unit 20 may be configured without the dimmer plates.

A camera 60 is arranged on the front frame 27 of the image display unit 20. The configuration and arrangement of the camera 60 is determined so as to capture an image of outside scenery to be visually recognized by the user wearing the image display unit 20. The outside scenery refers to scene of outside in the direction of line of sight of the user wearing the image display unit 20 on the head. For example, the camera is provided in a front surface of the front frame 27 at a position where the camera 61 does not block the outside light transmitted through the right light guide plate 26 and the left light guide plate 28. In the example illustrated in FIG. 1, the camera 60 is arranged on the end ER side of the front frame 27, and functions as a detection unit for detecting a part of the body or an object attached on the body of the user as an indicator.

The camera 60 is a digital camera equipped with an imaging lens, an imaging element such as a CCD or a CMOS, and the like. In the exemplary embodiment, the camera 60 is a monocular camera, but may be a stereo camera. The camera 60 captures at least part of outside scenery in the front side direction of the HMD 100, in other words, in a direction of the field of view of the user wearing the HMD 100. In other words, the camera 60 captures an image of a range overlapping with the field of view of the user or the direction of the field of view of the user, i.e., in a direction of field of fixation by the user. A direction and a width of an angle of view of the camera 60 may selectively be set. In the exemplary embodiment, as described later, the angle of view of the camera 60 includes outside world visually recognized by the user through the right light guiding plate 26 and the left light guiding plate 28. More preferably, the angle of view of the camera 60 is set to so that the entire field of view that the user can visually recognize through the right light guiding plate 26 and the left light guiding plate 28 can be captured.

The camera 60 performs image capturing in accordance with control of an imaging control unit 153 (FIG. 5) provided with the control unit 150. When the power switch 18 is turned on and a main processor 140 receives power supply from a power supply unit 130 to be activated, the main processor 140 causes the power supply unit 130 to start power supply to the camera 60, and causes the camera 60 to turn on. When the camera 60 turns on, the imaging control unit 153 causes the camera 60 to perform image capturing every predetermined time period to generate captured image data. The captured image data is written in a memory 121 (refer to FIG. 4), and is temporarily stored.

The HMD 100 may include a distance sensor (not illustrated) for detecting a distance to a measurement object positioned in a preset measurement direction. The distance sensor may be arranged at the connection between the right light guiding plate 26 and the left light guiding plate 28 of the front frame 27, for example. In this case, in the state where the image display unit 20 is mounted on the user, the position of the distance sensor is substantially in the middle of both the eyes of the user in the horizontal direction and on an upper side of both the eyes of the user in the vertical direction. The measurement direction of the distance sensor may be, for example, the front direction of the front frame 27, in other words, a direction overlapping with an image capturing direction of the camera 60. The distance sensor may include, for example, a light source such as an LED or a laser diode, and a light-receiving unit for receiving light that is emitted by the light source and is reflected by the measurement object. The distance sensor is only required to perform measurement processing based on triangular measurement processing or a time difference in accordance with control of the control unit 150. The distance sensor may include, for example, a sound source for transmitting an ultrasonic wave and a detection unit for receiving the ultrasonic wave reflected by the measurement object. In this case, the distance sensor is only required to perform measurement processing based on a time difference to the reflection of the ultrasonic wave in accordance with control of the control unit 150.

Figure 2:
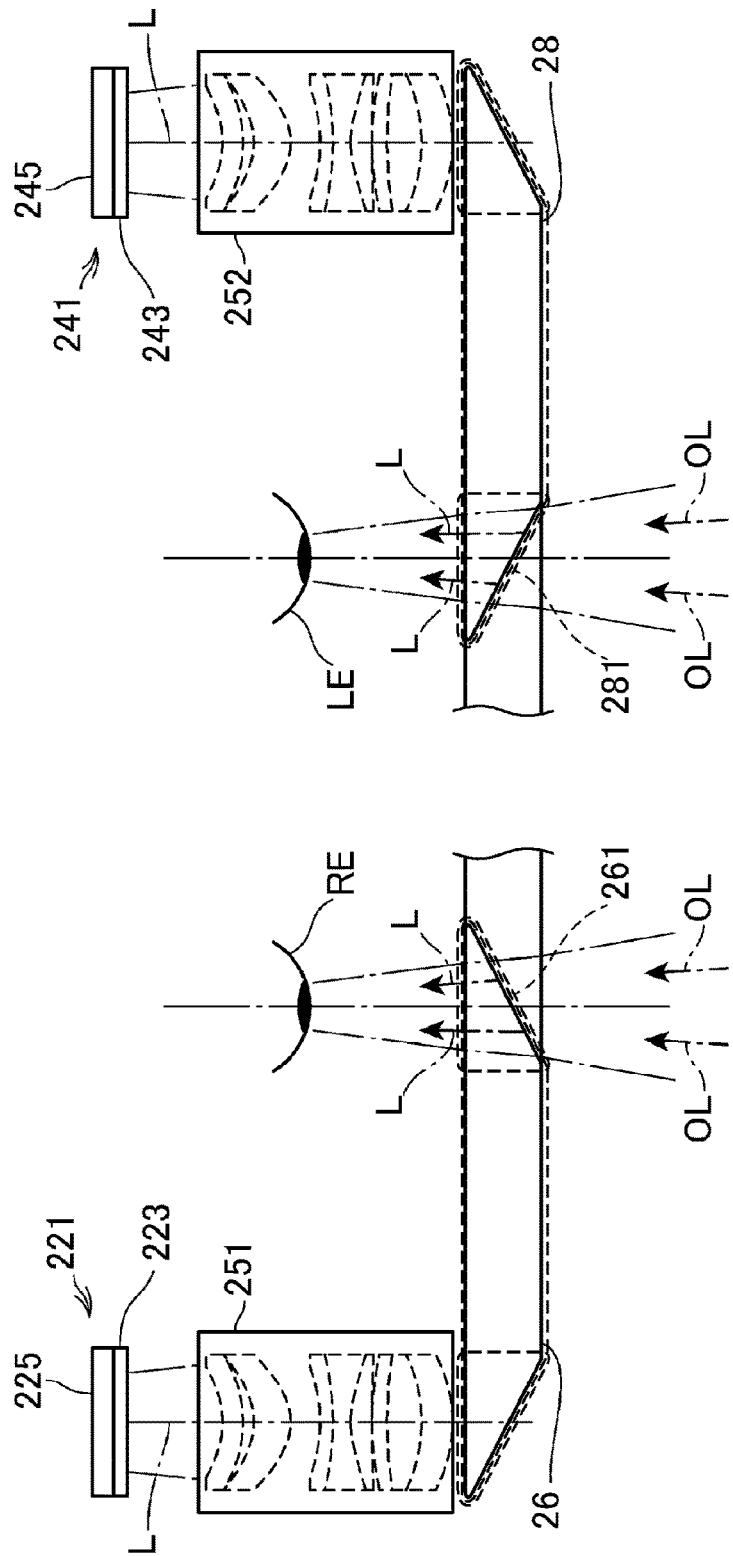
FIG. 2 is a plan view illustrating a main part of a configuration of an optical system of the HMD.

FIG. 2 is a plan view illustrating a main part of a configuration of an optical system included in the image display unit 20. For description, in FIG. 2, a left eye LE and a right eye RE of the user are illustrated.

As illustrated in FIG. 2, the right display unit 22 and the left display unit 24 are configured laterally symmetrically. As a configuration allowing the right eye RE of the user to visually recognize an image, the right display unit 22 includes an Organic Light-Emitting Diode (OLED) unit 221 for emitting image light and a right optical system 251 including a lens group for guiding image light L emitted by the OLED unit 221. The image light L is guided to the right light guiding plate 26 by the right optical system 251.

The OLED unit 221 includes an OLED panel 223 and an OLED drive circuit 225 configured to drive the OLED panel 223. The OLED panel 223 is a self-light-emitting display panel including light emitting elements emitting red (R) color light, green (G) color light, and blue (B) color light by organic electro-luminescence are arranged in a matrix. The OLED panel 223 includes a plurality of pixels, each pixel corresponding to a unit including one element of R, one element of G, and one element of B. An image is formed by the pixels arranged in a matrix. In accordance with the control of the control unit 150 (FIG. 5), the OLED drive circuit 225 selects the light-emitting elements and applies a current to the light-emitting elements included in the OLED panel 223 to cause the light-emitting elements of the OLED panel 223 to emit light. The OLED drive circuit 225 is fixed by bonding or the like, to a back surface of the OLED panel 223, i.e., a back side of a light-emitting surface. The OLED drive circuit 225 may include a semiconductor device for driving the OLED panel 223, for example, and may be mounted on a substrate (not illustrated) fixed to the back surface of the OLED panel 223. A temperature sensor 217 is mounted on the substrate.

The OLED panel 223 may have a configuration in which light-emitting elements to emit white color light are arranged in a matrix and color filters corresponding to the R color, the G color, and the B color, are arranged to overlap with the light-emitting elements. Further, in addition to the light-emitting elements emitting R color light, G color light, and B color light, the OLED panel 223 with a WRGB configuration including light-emitting elements emitting white (W) color light may be adopted.

The right optical system 251 includes a collimate lens configured to collimate the image light L emitted from the OLED panel 223. The image light L collimated by the collimate lens enters the right light guiding plate 26. An optical path configured to guide light in the right light guiding plate 26 is formed with a plurality of reflective faces configured to reflect the image light L. The image light L reflected multiple times in the right light guiding plate 26 is guided to the right eye RE. The right light guiding plate 26 is formed with a half mirror 261 (reflective surface) in front of the right eye RE. The image light L is reflected by the half mirror 261, is emitted from the right light guiding plate 26 to the right eye RE. The image light L forms an image on the retina of the right eye RE to allow the user to visually recognize the image.

Further, as a configuration for allowing the user to visually recognize an image with the left eye LE, the left display unit 24 includes an OLED unit 241 for emitting image light and a left optical system 252 including a lens group for guiding the image light L emitted by the OLED unit 241. The image light L is guided to the left light guiding plate 28 by the left optical system 252.

The OLED unit 241 includes an OLED panel 243 and an OLED drive circuit 245 for driving the OLED panel 243. The OLED panel 243 is a light emission type display panel similar to the OLED panel 223. In accordance with the control of the control unit 150 (FIG. 5), the OLED drive circuit 245 selects the light-emitting elements and applies a current to the light-emitting elements included in the OLED panel 243 to cause the light-emitting elements of the OLED panel 243 to emit light. The OLED drive circuit 245 is fixed by bonding or the like, to a back surface of the OLED panel 243, i.e., a back side of a light-emitting surface. The OLED drive circuit 245 may include a semiconductor device for driving the OLED panel 243, for example, and may be mounted on a substrate (not illustrated) fixed to the back surface of the OLED panel 243. A temperature sensor 239 is mounted on the substrate.

The left optical system 252 includes a collimate lens for collimating the image light L emitted from the OLED panel 243. The image light L collimated by the collimate lens enters the left light guiding plate 28. The left light guiding plate 28 is an optical element having a plurality of reflective surface configured to reflect the image light L, and is formed of, for example, a prism. The image light L reflected multiple times in the left light guiding plate 28 is guided to the left eye LE. The left light guiding plate 28 is formed with a half mirror 281 (reflective surface) in front of the right eye LE. The image light L reflected by the half mirror 281 is emitted from the left light guiding plate 28 to the left eye LE. The image light L forms an image on the retina of the left eye LE to allow the user to visually recognize the image.

With this configuration, the HMD 100 functions as a see-through type display device. That is, the image light L reflected by the half mirror 261 and the outside light OL passing through the right light guiding plate 26 enter the right eye RE of the user. The image light L reflected by the half mirror 281 and the outside light OL passing through the half mirror 281 enter the left eye LE. In this manner, the HMD 100 allows the image light L of the internally processed image and the outside light OL to be combined to enter the user's eyes. The user sees outside scenery through the right light guiding plate 26 and the left light guiding plate 28, and an image formed by the image light L is displayed to be visually recognizable in an overlapped manner with the outside scenery or around the outside scenery. The half mirrors 261 and 281 are image pickup units for reflecting the image light output from the right display unit 22 and the left display unit 24 and picking up the images, and may be referred to as display units.

Note that, the left optical system 252 and the left light guiding plate 28 are collectively referred to as a "left light-guiding unit". The right optical system 251 and the right light guiding plate 26 are collectively referred to as a "right light-guiding unit". The configurations of the right light-guiding unit and the left light-guiding unit are not limited to the example described above, and any scheme may be adopted as long as image light forms a visual image in front of the user's eyes. For example, a diffraction grating may be used, and a transflective film may be used.

Referring back to FIG. 1, the control device 10 and the image display unit 20 are coupled via a coupling cable 40. The coupling cable 40 is detachably coupled to a connector provided at a lower part of the case 10A, and connects to various circuits inside the image display unit 20 through a tip of the left holding portion 23. The coupling cable 40 includes a metal cable or an optical fiber cable for transmitting digital data, and may include a metal cable for transmitting analog signals. A connector 46 is provided at a mid-point of the coupling cable 40. The connector 46 is a jack to which a stereo mini-plug is connected, and is coupled to the control device 10, for example, via a line through which analog voice signals are transmitted. In the configuration example illustrated in FIG. 1, the connector 46 is coupled to a headset 30 including the right earphone 32 and the left earphone 34, which form a stereo headphone, and a microphone 63.

The control device 10 and the image display unit 20 may be coupled in a wireless manner. For example, the control device 10 and the image display unit 20 may be configured to mutually transmit and receive control signals and data through wireless communication conforming standards such as Bluetooth (registered trademark) and a wireless LAN (including Wi-Fi (registered trademark)).

As illustrated in FIG. 1, for example, the microphone 63 is arranged so that a sound collector of the microphone 63 is oriented in the direction of the user's line of sight, collects sound, and outputs sound signals to a sound interface 180 (FIG. 4). The microphone 63 may be, for example, a monaural microphone or a stereo microphone, or may be a directional microphone or a non-directional microphone.

Figure 3:
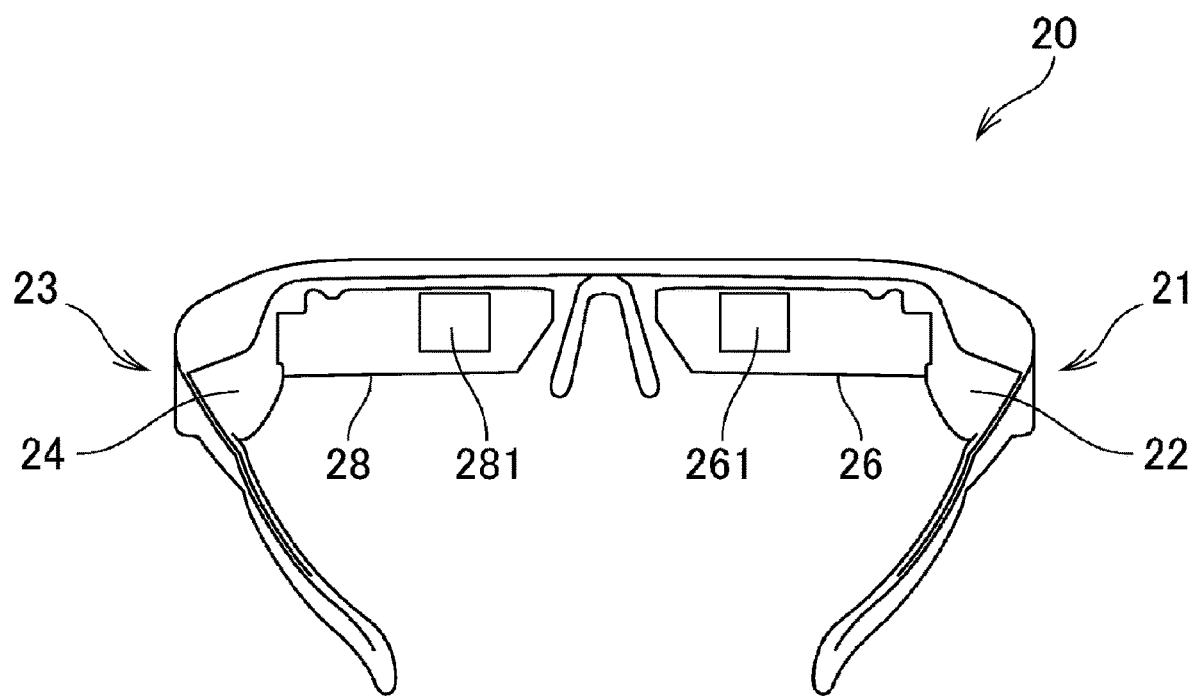
FIG. 3 is a perspective view illustrating a configuration of an image display unit.

FIG. 3 is a perspective view for illustrating a configuration of the image display unit 20 and illustrates a main configuration when the image display unit 20 is viewed from the user's head. In FIG. 3, the side of the image display unit 20 that come into contact with the user's head, in other words, the side that can be seen by the user with the right eye RE and the left eye LE are illustrated. In other words, the back sides of the right light guiding plate 26 and the left light guiding plate 28 are illustrated.

In FIG. 3, the half mirror 261 for emitting image light to the right eye RE of the user and the half mirror 281 for emitting image light to the left eye LE are also illustrated as approximately quadrangle-shaped regions. Further, as described above, outside light passes through the entire areas of the right light guiding plate 26 and the left light guiding plate 28 including the half mirrors 261 and 281. Thus, the user visually recognizes outside scenery through the entire areas of the right light guiding plate 26 and the left light guiding plate 28, and visually recognizes rectangular display images at the positions of the half mirrors 261 and 281.

The camera 60 is arranged at an end on the right side of the image display unit 20 to capture an image in the direction of the line of sight of both user's eyes, i.e., in front of the user. The optical axis of the camera 60 extends in a direction including the direction of the line of sight of the right eye RE and the left eye LE. The outside scenery that can be visually recognized by the user wearing the HMD 100 is not necessarily at infinity. For example, in a case where the user gazes a target object positioned in front of the user with both the eyes, the distance from the user to the object often ranges from approximately 30 cm to 10 m, and more often ranges from 1 m to 4 m. Based upon this, standard maximum and minimum distances from the user to the object that the user can take during normal use of HMD 100 may be specified. The standards may be obtained through investigation and experiments, and may be set by the user. It is preferred that the optical axis and the angle of view of the camera 60 be determined such that the target object is included within the angle of view in a case where the distance to the object during normal use corresponds to the set standards of the maximum and minimum distances.

In general, human beings generally have a visual field angle of approximately 200 degrees in the horizontal direction and approximately 125 degrees in the vertical direction. Particularly, an effective visual field within the visual field angle that is excellent in information receptivity is approximately 30 degrees in the horizontal direction and approximately 20 degrees in the vertical direction. It has been assumed that a stable gazing visual field where a human being can quickly stably see a gazing point is approximately 60 to 90 degrees in the horizontal direction and approximately 45 to 70 degrees in the vertical direction. In the case of the target object in which the gazing point is in front of the user, the effective visual field in the visual field of the user is approximately 30 degrees in the horizontal direction and approximately 20 degrees in the vertical direction with respect to respective lines of sights of the right eye RE and the left eye LE as center lines. The stable gazing visual field is from approximately 60 degrees to 90 degrees in the horizontal direction and from approximately 45 degrees to 70 degrees in the vertical direction. The visual field angle is approximately 200 degrees in the horizontal direction and approximately 125 degrees in the vertical direction. The visual field in which the user actually visually recognizes an object through the right light guiding plate 26 and the left light guiding plate 28 can be referred to as an actual Field Of View (FOV). In the configuration of the exemplary embodiment illustrated in FIG. 1 and FIG. 2, the actual field of view corresponds to the actual field of view in which the user visually recognizes an object through the right light guiding plate 26 and the left light guiding plate 28. The actual field of view is narrower than the visual field angle and the stable gazing visual field, but wider than the effective visual field.

The camera 60 captures an image of an area including outside scenery that is visually recognizable together with an image to be displayed by the image display unit 20. It is preferred that the angle of view of the camera 60 be capable of capturing an area wider than the visual field of the user. Specifically, it is preferred that the angle of view be wider than at least the effective visual field of the user. Further, it is preferred that the angle of view be wider than the actual visual field of the user. It is further preferred that the angle of view be wider than the stable gazing visual field of the user, and it is most preferred that the angle of view be wider than the visual field of the both eyes of the user.

The camera 60 may include a so-called wide-angle lens as an imaging lens to enable imaging of a wide angle of view. The wide angle lens may include a lens called a super wide angle lens or a semi-wide angle lens, or may be a single focal lens or a zoom lens. The camera 60 may include a lens group formed of a plurality of lenses.

FIG. 4 is a block diagram illustrating a configuration of each part forming the HMD 100.

The control device 10 includes the main processor 140 executing programs to control the HMD 100. The memory 121 and a non-volatile storage unit 123 are coupled to the main processor 140. As sensors, a six-axis sensor 111 and a magnetic sensor 113 are coupled to the main processor 140. A GPS receiver 115, a communication unit 117, a sound codec 182, an external connector 184, an external memory interface 186, a USB connector 188, a sensor hub 192, and an FPGA 194 are coupled to the main processor 140. The components function as an interface with external devices. The LED indicator 12, an LED display unit 17, a vibrator 19, the operation unit 110, and the power supply unit 130 are coupled to the main processor 140.

The main processor 140 is mounted on a controller substrate 120 built into the control device 10. On the controller substrate 120, in addition to the main processor 140, the memory 121, the non-volatile storage unit 123, the six-axis sensor 111, the magnetic sensor 113, the GPS receiver 115, the communication unit 117, the sound codec 182, and the like are further mounted. In the exemplary embodiment, the external connector 184, the external memory interface 186, the USB connector 188, the sensor hub 192, the FPGA 194, and an interface 196 are mounted on the controller substrate 120.

In a case where the main processor 140 executes a control program, the memory 121 forms a work area temporarily storing the control program to be executed and data to be processed. The non-volatile storage 123 includes a flash memory and an embedded multi media card (eMMC). The non-volatile storage 123 stores programs to be executed by the main processor 140 and various data to be processed by the main processor 140 executing the programs.

In FIG. 4, a configuration in which the function of the control device 10 is achieved by one main processor 140, but the function of the control device 10 may be achieved by a plurality of processors or semiconductor chips. For example, the controller substrate 120 may further be equipped with a co-processor such as a System-on-a-Chip (SoC), a Micro Control Unit (MCU), and a Field-Programmable Gate Array (FPGA). The control device 10 may perform various controls by causing both the main processor 140 and the co-processor to cooperate with each other or selectively using one of both.

The six-axis sensor 111 is a motion sensor (inertial sensor) including a three-axis acceleration sensor and a three-axis gyro (angular velocity) sensor. An Inertial Measurement Unit (IMU) including the above-mentioned sensors as a module may be adopted as the six-axis sensor 111. The magnetic sensor 113 is a three-axis geomagnetic sensor, for example.

The six-axis sensor 111 and the magnetic sensor 113 output detected values to the main processor 140 in accordance with sampling frequencies designated in advance. In response to a request from the main processor 140, the six-axis sensor 111 and the magnetic sensor 113 outputs the detected values to the main processor 140 at the timings designated by the main processor 140.

The GPS receiver 115 includes a GPS antenna (not illustrated), and receives a GPS signal transmitted from a GPS satellite. The GPS receiver 115 outputs the received GPS signal to the main processor 140. The GPS receiver 115 measures a signal strength of the received GPS signal, and outputs the measurement value to the main processor 140. As the signal strength, for example, information such as a Received Signal Strength Indication (RSSI), an electric field strength, a magnetic field strength, and a Signal-to-Noise ratio (SNR) may be used.

The communication unit 117 performs wireless communications with an external device. The communication unit 117 includes an antenna, a RF circuit, a baseband circuit, and a communication control circuit, or the like, or is formed of a device with the above-mentioned components integrated each other. The communication unit 117 performs wireless communications conforming standards such as Bluetooth and a wireless LAN (including Wi-Fi), for example.

The sound interface 180 is an interface receiving and outputting sound signals. In the exemplary embodiment, the sound interface 180 includes the connector 46 (FIG. 1) provided with the coupling cable 40. The connector 46 is coupled to the headset 30. The sound signal output from the sound interface 180 is received by the right earphone 32 and the left earphone 34. Then, the right earphone 32 and the left earphone 34 outputs the sound. The microphone 63 provided with the headset 30 collects sound, and outputs a sound signal to the sound interface 180. The sound signal input from the microphone 63 to the sound interface 180 is received by the external connector 184.

The sound codec 182 is coupled to the sound interface 180, and encodes and decodes sound signals input and output via the sound interface 180. The sound codec 182 may include an A/D converter for converting an analog sound signal into digital sound data and a D/A converter for performing the opposite conversion. For example, the HMD 100 according to the exemplary embodiment outputs sounds from the right ear piece 32 and the left ear piece 34, and collects sounds from the microphone 63. The sound codec 182 converts digital sound data output from the main processor 140 into an analog sound signal, and outputs the analog sound signal via the sound interface 180. The sound codec 182 converts an analog sound signal input to the sound interface 180 into digital sound data, and outputs the digital sound data to the main processor 140.

The external connector 184 is a connector for coupling the main processor 140 to an external device that performs communications with the main processor 140. For example, the external connector 184 couples the external device to the main processor 140, and is an interface for establishing coupling to the external device in a case where a program executed by the main processor 140 is debugged or a log of an operation of the HMD 100 is collected.

The external memory interface 186 is an interface that is capable of being coupled to a portable memory device, and includes, for example, a memory card slot mounted with a card-type recording medium for reading data and an interface circuit. In this case, a size, a shape, and a standard of the card-type recording medium is not limited, and may be changed as appropriate.

The universal serial bus (USB) connector 188 includes a connector conforming to the USB standard, and an interface circuit. The USB connector 188 is capable of being coupled to a USB memory device, a smart phone, and a personal computer. the size and shape of the USB connector 188, as well as the version of the USB standard that is matched, may be selected as appropriate.

The sensor hub 192 and the FPGA 194 are coupled to the image display unit 20 via the interface (I/F) 196. The sensor hub 192 acquires detected values of the various sensors included in the image display unit 20, and outputs the detected values to the main processor 140. The FPGA 194 processes data to be transmitted and received between the main processor 140 and the components of the image display unit 20, and also executes transmissions via the interface 196.

The LED indicator 12 turns on and off in response to the operation state of the HMD 100. The LED display unit 17 controls turning-on and turning-off of the LED indicator 12 in accordance with the control of the main processor 140. The LED display unit 17 may include LEDs (not illustrated) arranged directly under the track pad 14 and a drive circuit for turning on the LEDs. In this case, the LED display unit 17 turns on, blinks and turns off the LEDs in accordance with the control of the main processor 140.

The vibrator 19 includes a motor (not illustrated) and an eccentric rotor (not illustrated), and may include other necessary components. The vibrator 19 generates vibration by causing the above-mentioned motor to rotate in accordance with the control of the main processor 140. For example, in a case where an operation on the operation unit 110 is detected, a case where the power supply of the HMD 100 is turned on or off, or any other cases, the HMD 100 causes the vibrator 19 to generate vibration in a predetermined vibration pattern.

The operation unit 110 includes the operation elements 13 and the track pad 14. The operation elements 13 includes the operation buttons 11, the up and down keys 15, the change-over switch 16, and the power switch 18. In a case where the operation elements 13 and the track pad 14 are operated, the operation unit 110 outputs operation signals including identification information of the operation elements 13 and the track pad 14 that are operated and information indicating the received operation contents to the control unit 150.

The control device 10 includes the power supply unit 130, and operates by electric power supplied from the power supply unit 130. The power supply unit 130 includes a chargeable battery 132 and a power supply control circuit 134 for detecting a remaining amount of the battery 132 and controlling charge of the battery 132. The power supply control circuit 134 is coupled to the main processor 140, and outputs the detected value of the remaining amount of the battery 132 and the detected value of a voltage to the main processor 140. Power may be supplied from the control device 10 to the image display unit 20, based on the power supplied by the power supply unit 130. The main processor 140 may be configured to control a state of power supply from the power supply unit 130 to the components of the control device 10 and the image display unit 20.

The right display unit 22 and the left display unit 24 of the image display unit 20 are coupled to the control device 10. As illustrated in FIG. 1, in the HMD 100, the coupling cable 40 is coupled to the left holding part 23. A wire coupled to the coupling cable 40 is arranged in the image display unit 20 to couple the right display unit 22 and the left display unit 24 to the control device 10.

The right display unit 22 includes a display unit substrate 210. On the display unit substrate 210, an interface (I/F) 211 to be coupled to the interface 196, a receiver (Rx) 213 for receiving data input from the control device 10 via the interface 211, and an EEPROM 215 are mounted.

The interface 211 couples the receiver 213, the EEPROM 215, the temperature sensor 217, the camera 60, an illuminance sensor 65, and an LED indicator 67 to the control device 10.

The Electrically Erasable Programmable Read-Only Memory (EEPROM) 215 stores the various data in a form readable by the main processor 140. The EEPROM 215 stores data about light-emitting characteristics and display characteristics of the OLED units 221 and 241 provided with the image display unit 20, and data about sensor characteristics of the right display unit 22 or the left display unit 24, for example. Specifically, the EEPROM 215 stores parameters regarding Gamma correction performed by the OLED units 221 and 241, data used to compensate for the detected values of the temperature sensors 217 and 239, and the like. These data are generated when the HMD 100 is inspected upon shipping from a factory, and written in the EEPROM 215. After shipping, the main processor 140 may perform processing through use of the data of the EEPROM 215.

The camera 60 captures an image in accordance with a signal input via the interface 211, and outputs the captured image data or a signal indicative of the result of imaging to the control device 10.

As illustrated in FIG. 1, the illuminance sensor 65 is provided on the end ER of the front frame 27, and is arranged so as to receive outside light coming from the front side of the user wearing the image display unit 20. The illuminance sensor 65 outputs a detected value corresponding to the amount of received light (intensity of received light).

As illustrated in FIG. 1, the LED indicator 67 is arranged in the vicinity of the camera 60 on the end ER of the front frame 27. The LED indicator 67 is configured to turn on while the camera 60 is capturing images to notify that the capturing is in progress.

The temperature sensor 217 detects a temperature, and outputs a voltage value or a resistance value corresponding to the detected temperature as a detected value. The temperature sensor 217 is mounted on the back surface of the OLED panel 223 (FIG. 2). The temperature sensor 217 and the OLED drive circuit 225 may be mounted on a single substrate, for example. With this configuration, the temperature sensor 217 mainly detects the temperature of the OLED panel 223.

The receiving unit 213 receives data transmitted from the main processor 140 via the interface 211. In a case where the receiver 213 receives the image data of the image to be displayed by the OLED unit 221, the receiver 213 outputs the received image data to the OLED drive circuit 225 (FIG. 2).

The left display unit 24 includes a display unit substrate 230. On the display unit substrate 230, an interface (I/F) 231 to be coupled to the interface 196 and a receiver (Rx) 233 for receiving data input from the control device 10 via the interface 231 are mounted. A six-axis sensor 235 and a magnetic sensor 237 are mounted on the display unit substrate 210. The interface 231 couples the receiver 233, the six-axis sensor 235, the magnetic sensor 237, and the temperature sensor 239 to the control device 10.

The six-axis sensor 235 is a motion sensor (inertial sensor) including a three-axis acceleration sensor and a three-axis gyro (angular velocity) sensor. An IMU including the above-mentioned sensors as a module may be adopted as the six-axis sensor 235. The magnetic sensor 237 is a three-axis geomagnetic sensor, for example.

The temperature sensor 239 detects a temperature, and outputs a voltage value or a resistance value corresponding to the detected temperature as a detected value. The temperature sensor 239 is mounted on the back surface of the OLED panel 243 (FIG. 2). The temperature sensor 239 and the OLED drive circuit 245 may be mounted on a single substrate, for example. With this configuration, the temperature sensor 239 mainly detects a temperature of the OLED panel 243. The temperature sensor 239 may be built into the OLED panel 243 or the OLED drive circuit 245. The above-mentioned substrate may be a semiconductor substrate. Specifically, in a case where the OLED panel 243 is mounted as an Si-OLED together with the OLED drive circuit 245 and the like to form an integrated circuit on an integrated semiconductor chip, the temperature sensor 239 may be mounted on the semiconductor chip.

The camera 60, the illuminance sensor 65, and the temperature sensor 217 in the right display unit 22, and the six-axis sensor 235, the magnetic sensor 237, and the temperature sensor 239 in the left display unit 24 are coupled to the sensor hub 192.

The sensor hub 192 sets and initializes sampling periods of the sensors in accordance with the control of the main processor 140. The sensor hub 192 applies a current to each sensor, transmits control data, and acquires detected values in accordance with the sampling period of the sensor. At a preset timing, the sensor hub 192 outputs detected values of the sensors included in the right display unit 22 and the left display unit 24 to the main processor 140. The sensor hub 192 may have a function of temporarily storing detected values of the sensors taking output timing to the main processor 140 into consideration. The sensor hub 192 may have a function of adapting to the differences in a signal form or data form of the output values from the sensors, specifically, a function of converting the output value of each sensor to data in an integrated data form, and outputting the converted data to the main processor 140.

The sensor hub 192 starts and stops applying of current to the LED indicator 67 in accordance with the control of the main processor 140, and turns on or blinks the LED indicator 67 in accordance with a timing at which the camera 60 starts or completes capturing an image.

Figure 5:
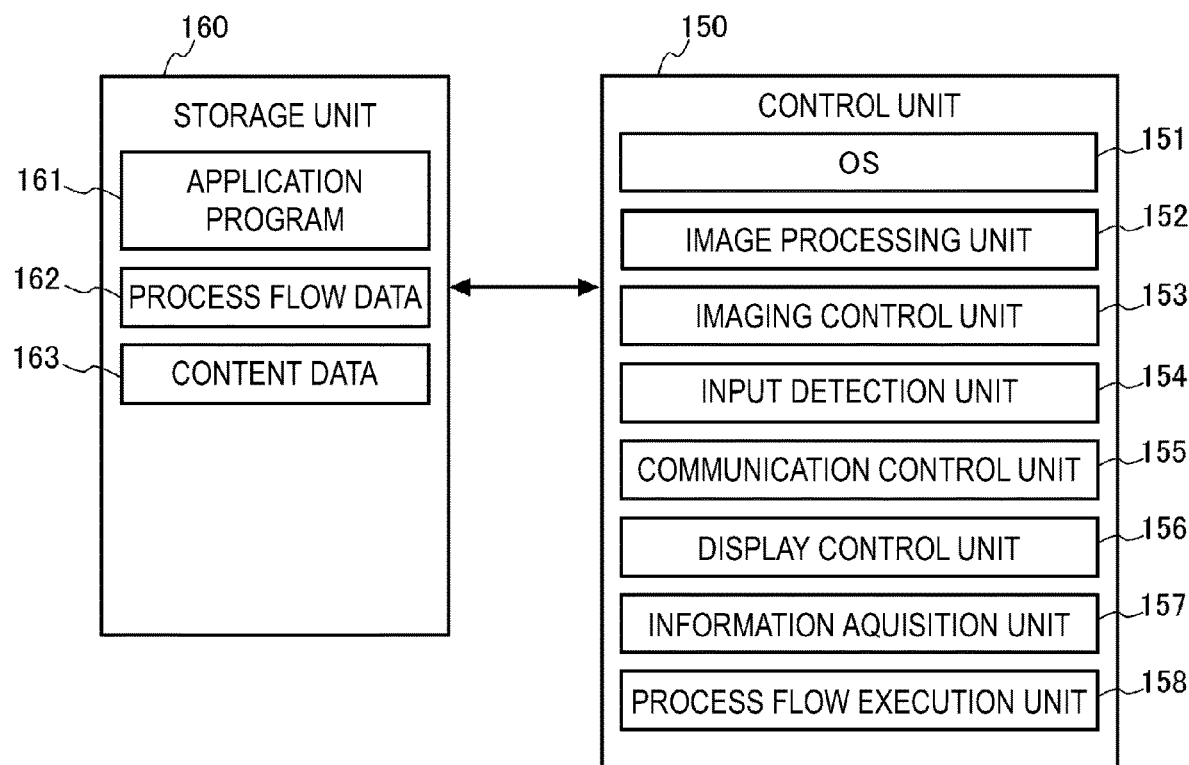
FIG. 5 is a function block diagram of a control device.

FIG. 5 is a function block diagram of a storage unit 160 and the control unit 150 forming a control system of the control device 10. The storage unit 160 illustrated in FIG. 5 is a logical storage unit formed of the non-volatile storage 123 (FIG. 4) and the EEPROM 215.

The storage unit 160 stores an application program 161, process flow data 162, and content data 163. The process flow data 162 corresponds to "control data" in the present invention.

The application program 161 is an application program having a specific function executed on an OS 151. The application program 161 is a program for causing the HMD 100 to execute a process flow created with the external device. The application program 161 may be an application program dedicated for executing a process flow, or may be a general-purpose program such as a web browser. A specific configuration of the application program 161 can be appropriately selected in view of a specification of the process flow data 162.

The process flow data 162 may be general-purpose data executable by various devices including the HMD 100 (e.g., a device without the camera 60) or the HMD 100 with a different type or specification. The process flow data 162 will be described later in detail.

The content data 163 is data of contents including images and movies to be displayed on the image display unit 20 in accordance with the control of the control unit 150, and the data includes image data and movie data. The content data 163 may include music and sound data.

The control unit 150 executes various processing through use of the data stored in the storage unit 160, and controls the HMD 100. The control unit 150 includes, as function blocks, the Operating System (OS) 151, an image processing unit 152, the imaging control unit 153, an input detection unit 154, a communication control unit 155, a display control unit 156, an information acquisition unit 157, and a process flow execution unit 158. The function blocks indicate the functions achieved by executing the control program by the main processor 140 as blocks for convenience. Thus, the function blocks do not refer to specific application programs or hardware.

The function of the OS 151 is a function of the control program stored in the storage unit 160, and other components are functions of the application programs executed on the OS 151.

For example, the image processing unit 152 reads out the content data 163 from the storage unit 160, and separates synchronizing signals such as a vertical synchronizing signal VSync, a horizontal synchronizing signal HSync from the read content data 163. In accordance with cycles of the vertical synchronizing signal VSync and the horizontal synchronizing signal HSync that are separated, the image processing unit 152 generates a clock signal PCLK through use of a Phase Locked Loop (PLL) circuit (not illustrated) and the like. The image processing unit 152 may apply, on image data included in the content data 163, various image processing such as resolution conversion, luminance adjustment, saturation adjustment, and 2D/3D conversion processing, as needed.

The image processing unit 152 develops the image data after the image processing in a DRAM in the storage unit 160 for each frame being a display unit of an image. A region of the DRAM in which one frame of the image data is developed is referred to as a frame region in the following description. The image processing unit 152 reads out the image data from the frame region, and causes the image display unit 20 to display the read image data.

The image processing unit 152 may be achieved by the main processor 140 executing a program or may be achieved by separate hardware from the main processor 140 (e.g., Digital Signal Processor (DSP)).

The imaging control unit 153 controls the camera 60 to capture an image to generate captured image data. The imaging control unit 153 causes the storage unit 160 to store the generated captured image data. In a case where the camera 60 is configured as a camera unit including a circuit generating the captured image data, the imaging control unit 153 acquires the captured image data from the camera 60, and causes the storage unit 160 to store the captured image data.

The input detection unit 154 detects an input by an operator, based on operation data input from the operation unit 110.

The communication control unit 155 controls the communication unit 117 to execute data communications with another device.

The display control unit 156 controls the right display unit 22 and the left display unit 24 of the image display unit 20 to control at least one of a display position and a display state of an object. The object is an image to be displayed in the display region VR by the HMD 100, and specifically, the object includes a character, a character string, a symbol, a figure, a number, an icon, and a button. The object includes a frame body surrounding at least one of a character, a character string, a symbol, a figure, a number, an icon, and a button.

The display position of the object controlled by the display control unit 156 is a display position of the object in the display region VR, and more specifically is a display position in a depth direction of the display region VR. "Depth" refers to a distance from the HMD 100 in a direction in which the user faces under the state in which the user wears the image display unit 20 on the head. Moreover, "depth direction" refers to a direction in which the user faces under the state in which the user wears the image display unit 20 on the head, that is, an orientation of the right display unit 22 and the left display unit 24, and a Z-axis direction illustrated in FIG. 1. In the exemplary embodiment, with the Z axis, the position of the HMD 100 is at the origin of the Z-axis. As a distance from the HMD 100 increases, a coordinate of the Z axis increases.

In a case where the object is, for example, a character string or a number, the display state of the object controlled by the display control unit 156 corresponds to control of a color, a font type, and a font size of the character string or the like. In a case where the object is a symbol, a figure, an icon, a button or the like, the display control unit 156 controls a color or a size of the object or the like.

Figure 6:
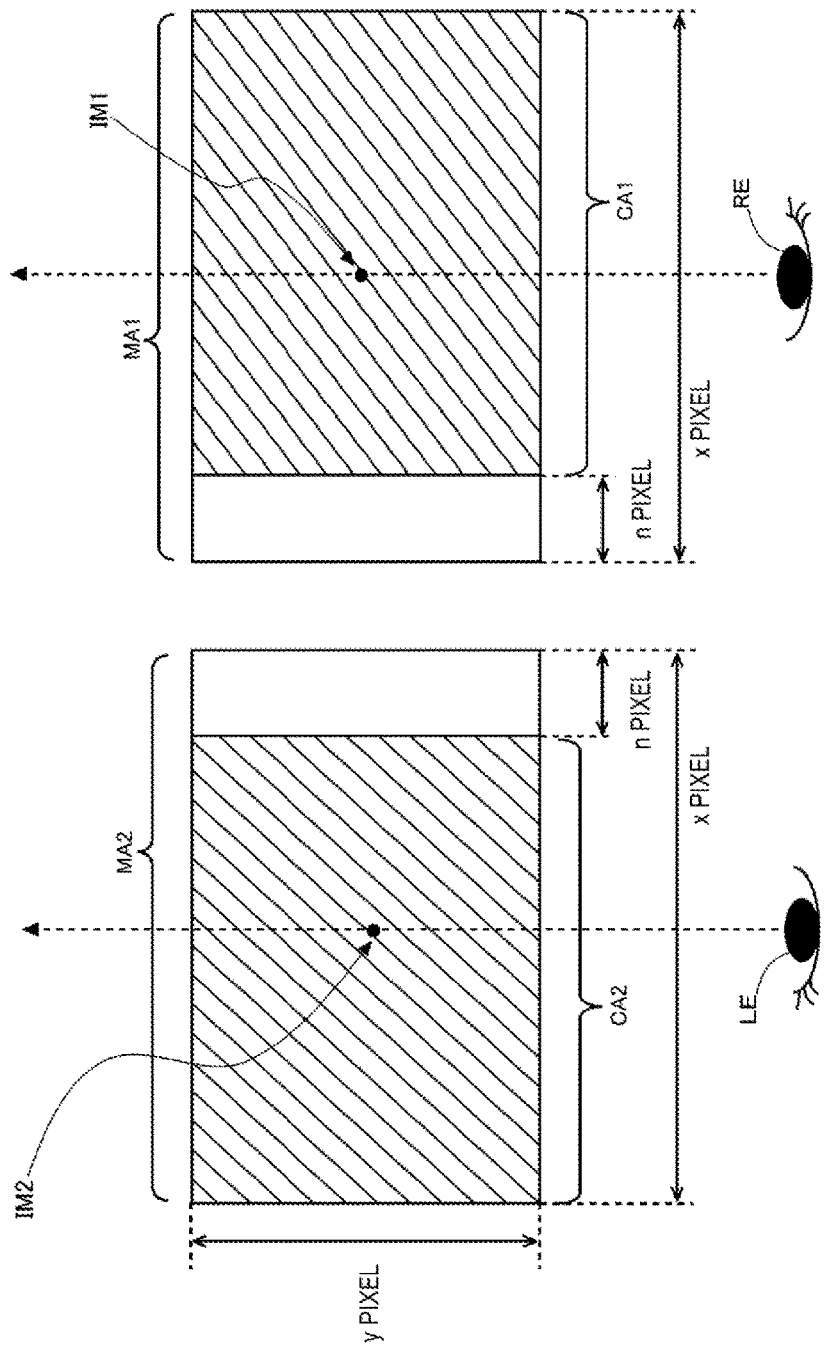
FIG. 6 is a view illustrating a relationship between a size of a reference region and a size of an emitting region.

FIG. 6 is a view illustrating a relationship between a size of a reference region and a size of an emitting region.

Figure 7:
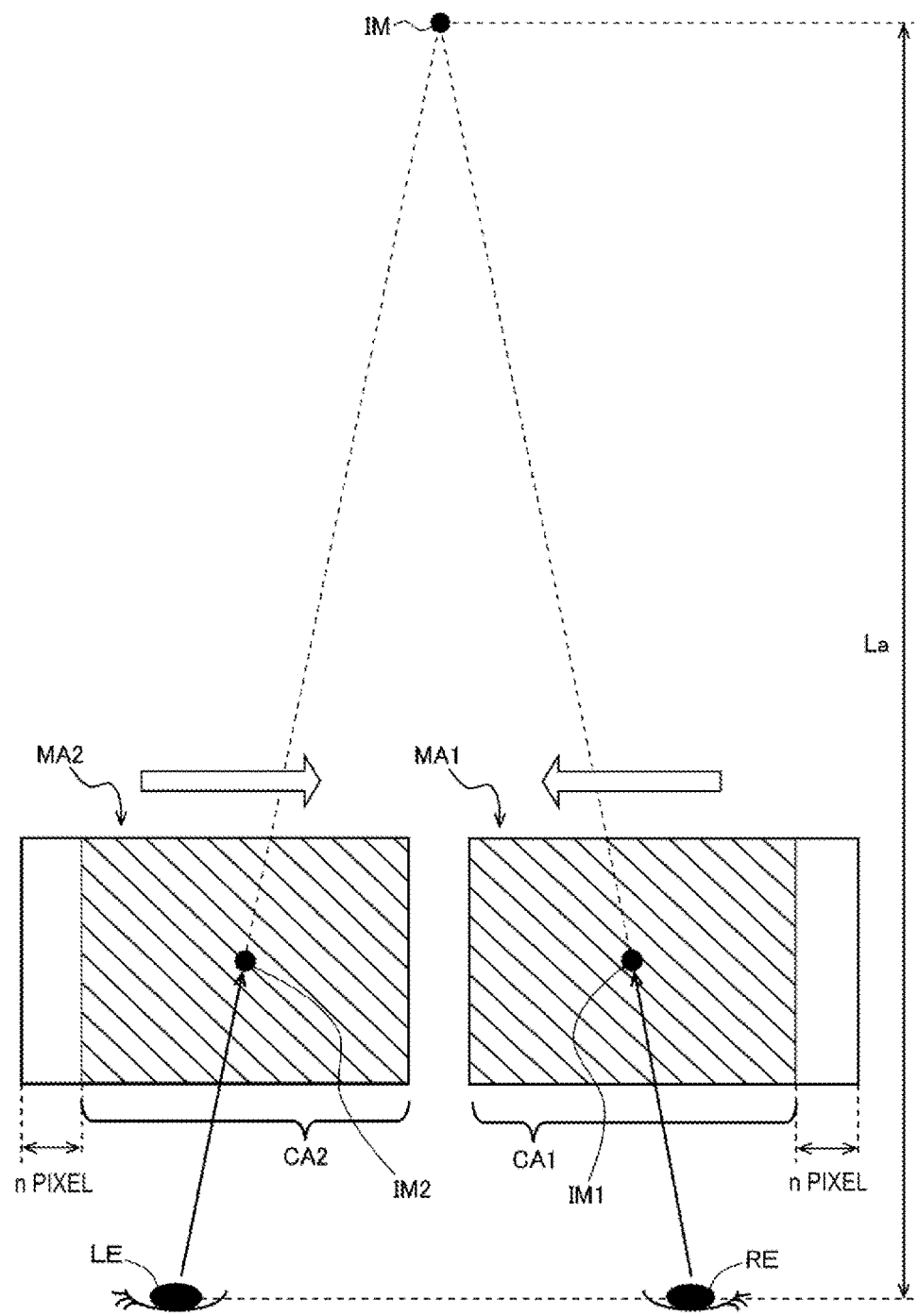
FIG. 7 is an explanatory view for illustrating an image formed by image light.

Here, with reference to FIG. 6 and FIG. 7, control of a display position of an image in the depth direction is described.

The reference region refers to an entire region or a part of the region in which each of the OLED unit 221 included in the right display unit 22 and the OLED unit 241 included in the left display unit 24 can form an image. The reference region may refer to the entire region or a part of the region in which the right display unit 22 and the left display unit 24 can emit the image light to the half mirrors 261 and 281, respectively. The reference region may refer to a region in which the image light can be emitted from the half mirrors 261 and 281 to the right eye RE and the left eye LE by using the light emitted from the right display unit 22 and the left display unit 24, respectively. The reference region may refer to a region in which the half mirrors 261 and 281 form a virtual image.

The emitting region refers to a region from which the image light is actually emitted from the right display unit 22 and the left display unit 24.

In the example of FIG. 6, a reference region MA1 in the right display unit 22 corresponding to the right eye RE of the user has a size of x pixel×y pixel. Similarly, a reference region MA2 in the left display unit 24 corresponding to the left eye LE of the user has a size of x pixel×y pixel.

In FIG. 6, the emitting region is indicated with hatched lines. In the exemplary embodiment, the emitting region is smaller than the reference region in the horizontal direction (transverse direction). Specifically, an emitting region CA1 in the right display unit 22 corresponding to the right eye RE of the user has a size of (x-n) pixel×y pixel, and is set smaller than the reference region MA1 in the horizontal direction. Similarly, an emitting region CA2 in the left display unit 24 corresponding to the left eye LE of the user has a size of (x-n) pixel×y pixel, and is set smaller than the reference region MA2 in the horizontal direction.

For example, in a case where a distance in the Z-axis direction for displaying the object is adjusted to infinity, a moving amount of the emitting region is "0 (pixel)". As a result, as illustrated in FIG. 6, an image IM1 visually recognized by the user with the right eye RE, based on the image light emitted from the emitting region CA1 and an image IM2 visually recognized by the user with the left eye LE, based on the image light emitted from the emitting region CA2 are in a state for parallel viewing. Thus, as a distance in the Z-axis direction for displaying the object, infinity can be achieved.

FIG. 7 is an explanatory view for illustrating an image formed with the image light emitted from the right display unit 22 and the left display unit 24 in a case where a distance from the right eye RE and the left eye LE is La.

A moving amount of the emitting regions in a case of adjusting the distance to La is assumed to be "n (pixel)." The display control unit 156 moves the emitting region CA1 in the right display unit 22 corresponding to the right eye RE of the user and the emitting region CA2 in the left display unit 24 corresponding to the left eye LE together by n pixel in directions toward the user's eyebrow (in directions of the outlined arrows in FIG. 7). As a result, the image IM1 visually recognized by the user with the right eye RE, based on the image light emitted from the emitting region CA1 and the image IM2 visually recognized by the user with the left eye LE, based on the image light emitted from the emitting region CA2 form an image at a position (IM) away from the eyes of the user by the distance La. As a result, the display position of the object in the Z-axis direction is adjusted to a target position.

As described above, an image formed with image light emitted from one display unit (22 or 24) and an image formed with image light emitted from the other display unit (22 or 24) moves together to be close to (or away from) each other. As a result, a convergence angle of the right eye RE and the left eye LE of the user with respect to the image formed with both the image light is changed to increase (decrease). Thus, the user using the HMD 100 can sense the image close to (away from) the user. Therefore, the display position in the Z-axis direction can be adjusted by adjusting the convergence angle of the right eye RE and the left eye LE of the user.

The information acquisition unit 157 reads out the data from the external device coupled via the external connector 184, the external memory I/F unit 186, and the USB connector 188. In a case where, for example, it is detected that a storage device is coupled to the I/F unit 186, the information acquisition unit 157 reads out data from the storage device, and causes the storage unit 160 to store the data. With this, the HMD 100 can read out and use the process flow data 162 stored in the storage device.

The process flow execution unit 158 executes the application program 161 stored in the storage unit 160, and executes a process flow in accordance with the process flow data 162.

Here, the process flow and the process flow data 162 are described.

The process flow is so-called work flow representing a work operation including a plurality of tasks. The process flow is a specific example of an operation flow. The operation flow includes a basic operation or a plurality of basic operations, and represents a sequence in which an order of execution of the basic operations is defined. For example, the basic operations include outputting of information such as a display, inputting of information, and processes such as a determination. A unit of operation is used as a unit when creating and editing an operation flow. The unit of operation is not particularly limited to this. Moreover, a unit of operation is used as a unit when creating and editing an operation flow. The unit of operation is not particularly limited to this. Specifically, when a process flow is created and edited, a content of each basic operation is not edited. Excluding this point of view, the basic operations are not limited. Accordingly. a content of each basic operation may be determined for convenience of editing an operation flow. A basic operation may contain a plurality of operations or processes, for example.

The process flow includes a plurality of tasks performed by an operator to achieve a set objective, and includes a process for outputting information to the operator during the plurality of tasks is performed. One unit of work performed by an operator and one output of information to the operator each corresponds to an operation step in an operation flow.

The process flow data 162 are data indicating a work process of work to be executed by the operator. The process flow data 162 includes work blocks included in the process flow, an order of execution of the work blocks, and setting contents set for each of the work blocks, and may include other information. The work blocks correspond to "operation steps" in the present invention.

The setting contents set for each of the work blocks include a process to be executed by the control unit 150. The process to be executed by the control unit 150 includes a process of displaying a screen including an image and a text as the information to the operator, and a process of reading a 2D code such as a QR code (registered trademark), receiving texts, and receiving input of a work result indicating "OK" or "error". The work blocks include inputting of a selection using a check box and inputting of a selection using a radio button.

The work blocks include, for example, a procedure display block, a reading block, an inputting block, a determination block, a selective input block, and a completion block.

The procedure display block is a block for causing the image display unit 20 to display an image or a text indicating a work procedure in the display region. The operator performs the work with reference to the image or the text displayed by the image display unit 20 in the display region.

The reading block is a block for causing the camera 60 to capture an image and reading a 2D code such as a QR code (registered trade mark) and a bar code from the captured image data of the camera 60.

For example, a reading frame for a 2D code and a guiding display for guiding the operator to set the 2D code within the reading frame are caused to be displayed by the control unit 150. In a case where an image of a 2D code is detected in the reading frame, the control unit 150 cause the storage unit 160 to store the detected image of the 2D code, and analyzes code information included in the 2D code.

The inputting block is a block for receiving an input from the operator by the operation unit 110 or the like. A method of receiving an input from the operator is not limited to a method using the operation unit 110. For example, a text recognition process using the captured image data of the camera 60 and a sound recognition process for sound collected with the microphone 63 may be used to detect various input including text. The read data obtained by reading a bar code may be acquired from a bar-code reader coupled through the external connector 184, and the acquired data may be received as the input by the operator. A motion of the operator obtained by detection values of the six-axis sensors 235 and 111 may be received as the input by the operator.

The determination block is a block for receiving an execution result of the work from the operator. For example, the operator performs work in accordance with the work procedure displayed in the procedure display block. As a work result, a work result indicating "OK" or "error" is input by the operation unit 110 or the like. In a case where the operation unit 110 receives input indicating "OK," the control unit 150 makes a positive determination. In this case, the control unit 150 executes a work block corresponding to the positive determination, for example, displays a screen including a next work content by executing the procedure display block. In a case where the operation unit 110 receives input indicating "error," the control unit 150 makes a negative determination. In this case, the control unit 150 executes a work block corresponding to the negative determination, for example, displays the same work content again to cause the same work to be executed again, or captures an image of a work result by the camera 60.

The selective input block is a block for receiving input of a selection using a check box or a radio button. In a case where the selective input block is executed, the control unit 150 displays a check box or a radio button so that the operator can visually recognized the check box or the radio button, to receive an operation of selecting the check box or the radio button. In response to the reception of the selected operation, the control unit 150 executes a work block corresponding to the received selection.

The completion block is a block indicating an end of the process flow.

The setting contents set for each of the work blocks of the process flow data 162 include setting information in which objects to be displayed in an emphasized manner are set. The setting information in which the objects to be displayed in an emphasized manner can be set for each of the work blocks. Thus, the objects to be displayed in an emphasized manner can be changed for each of the work blocks. The setting information corresponds to "selection information" in the present invention. The display in the emphasized manner refers to a display in which a display position of the set object in the Z-axis direction is different from display positions of other objects. The set object is displayed at a position different from the position of other objects in the Z-axis direction. Accordingly, the set object is caused to be distinguished from other objects, and hence the set object is prevented from being missed.

The set information includes at least information specifying the objects to be displayed in an emphasized manner. That is, the set information includes information specifying any of a character, a character string, a symbol, a figured, a number, an icon, and a button. In addition to the above, the set information may include information for designating a color and a size at the time of displaying the object.

In a case where the object includes a character or a character string, the set information may include information indicating a font type, a font size, boldness of a character, and a background color of a character. The work blocks may have different setting information from each other.

Figure 8:
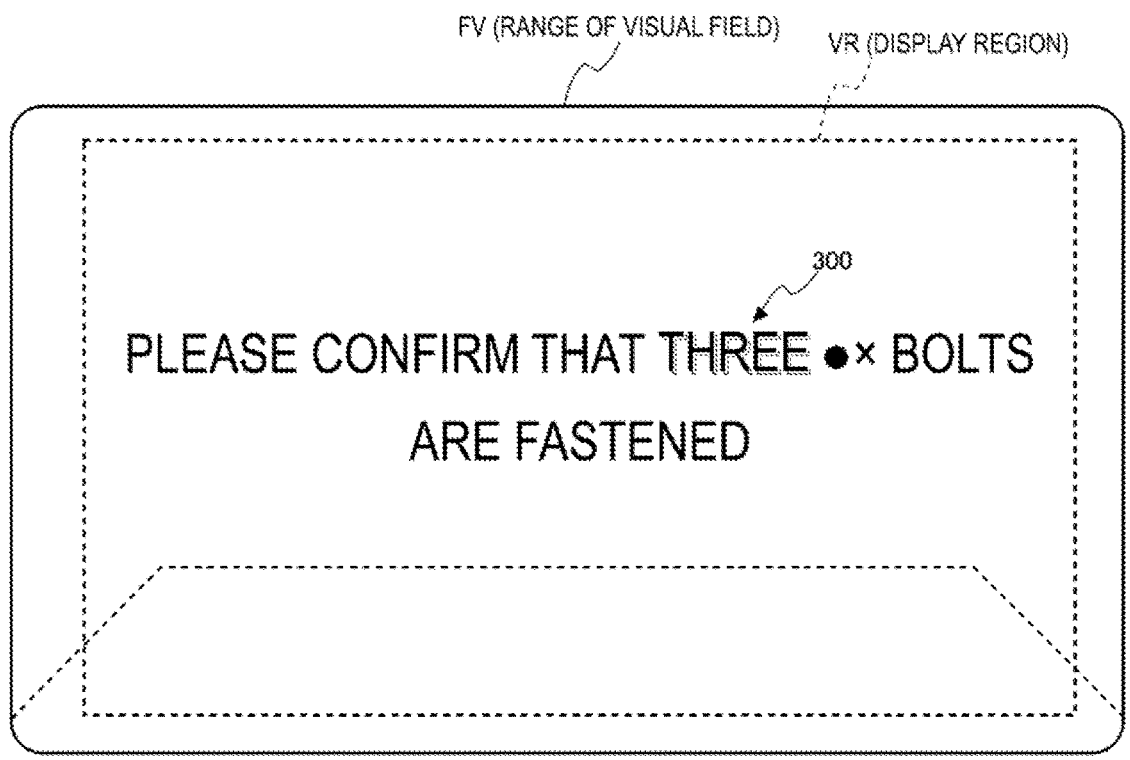
FIG. 8 is a view illustrating a display example of a display region.
Figure 8:
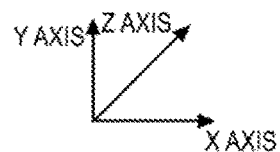

FIG. 8 is a view for illustrating a display example of the display region VR. Particularly, in FIG. 8, there is illustrated a state in which an image or a text indicating the work procedure is displayed in the display region VR by causing the control unit 150 to execute the procedure display block included in the process flow data 162.

In a case where the object set in the setting information in advance is detected in a document or an image to be displayed in the display region VR, the control unit 150 displays the set object, the display position of the set object in the Z-axis direction being different from display positions of other objects.

In the following description, as a specific example of the object set in advance, a case where a character string is set is described. Hereinafter, the character string set in advance is referred to as an emphasized character string 300.

For example, description is given of a case where characters saying "Please confirm that three •x bolts are fastened" are displayed in the display region VR. Description is given when a character string "three" is assumed to be the emphasized character string 300. In this case, the display control unit 156 displays the character "three" at a position in the Z-axis direction different from positions of other character strings. Specifically, the display control unit 156 adjusts the display position of the character "three" being the emphasized character string 300 in the Z-axis direction so that the character string "three" is displayed nearer than the display positions of other character strings.

Figure 9:
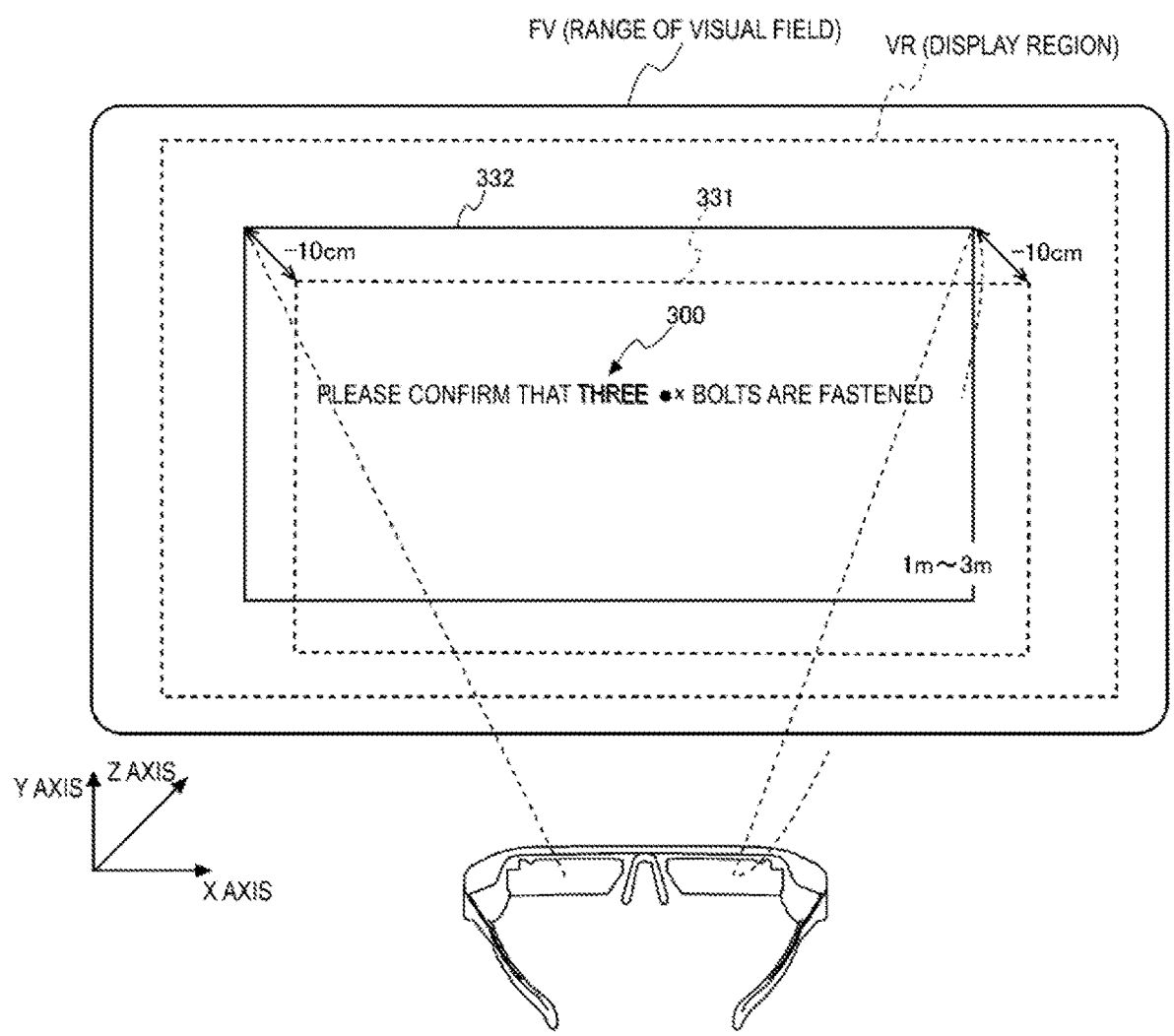
FIG. 9 is a view illustrating a display example of an emphasized character string displayed in the display region.

FIG. 9 is a view illustrating the emphasized character string 300 displayed in the display region VR.

A rectangular frame body 331 indicated with a broken line in FIG. 9 has a plane parallel with an X axis and a Y axis (hereinafter, referred to as an XY plane). The display position of the frame body 331 in the Z-axis direction is the same position as the display position of the emphasized character string 300. That is, the frame body 331 corresponds to a surface on which the emphasized character string 300 is displayed. The X axis corresponds to the horizontal direction in the display region VR, and the Y axis corresponds to the vertical direction in the display region VR.

A rectangular frame body 332 indicated with a solid line in FIG. 9 has the XY plane, and the display position of the frame body 332 in the Z-axis direction is the same position as the display positions of character strings other than the emphasized character string 300. That is, the frame body 332 is a plane on which character strings other than the emphasized character string 300 are displayed. Hereinafter, the character strings other than the emphasized character string 300 are referred to as "other character strings."

The display control unit 156 displays the characters other than the emphasized character string 300 at positions within a range of a distance from 1 m to 3 m in the Z-axis direction. That is, the frame body 332 is at a position within the range of the distance from 1 m to 3 m in the Z-axis direction. The display control unit 156 displays the emphasized character string 300 at a position in front of or behind other character strings by 10 cm. In FIG. 9, there is illustrated an example in which the frame body 331 is displayed at a position nearer than the position of the frame body 332 by 10 cm.

Figure 10:
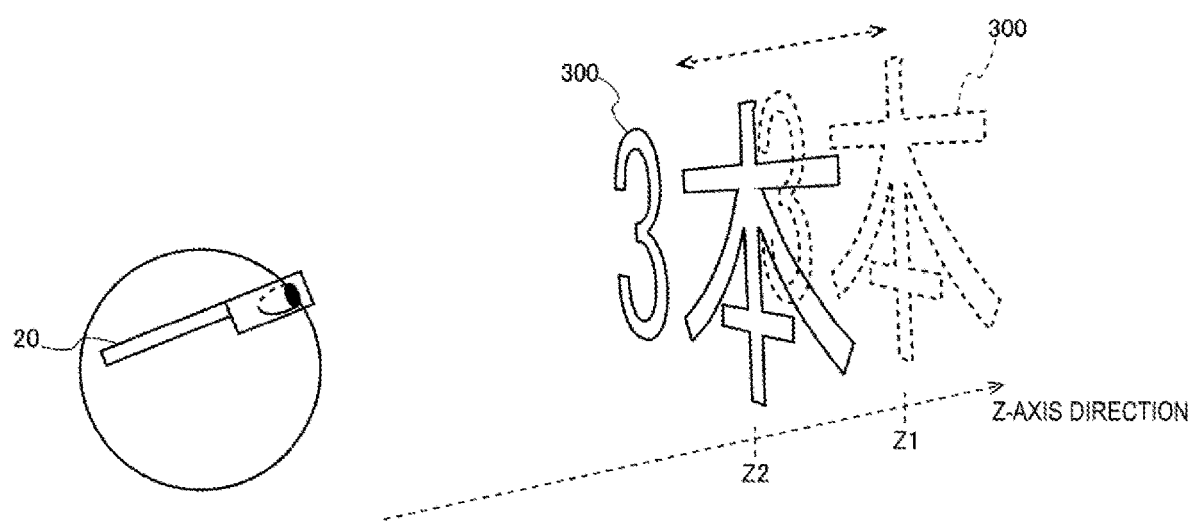
FIG. 10 is a view illustrating a display position of the character string in a Z axis direction.

FIG. 10 is a view illustrating a display position of the character string in the Z-axis direction. Particularly, FIG. 10 illustrates a state in which only the emphasized character string 300 is displayed.

The display control unit 156 causes the position of the emphasized character string 300 in the Z-axis direction to be changed every certain time. The certain time corresponds to "unit time" in the present invention. The certain time can be set and changed arbitrarily in accordance with the user's preference.

In FIG. 10, the emphasized character string 300 indicated with the broken lines is displayed at a coordinate "Z1" in the Z-axis direction. Although not illustrated in FIG. 10, the coordinate "Z1" is a position at which other character strings are displayed.

The emphasized character string 300 indicated with the solid lines is displayed at a coordinate "Z2" in the Z-axis direction. The coordinate "Z1" has a value larger than a value of the coordinate "Z2." That is, in a case where the emphasized character string 300 is displayed at the coordinate "Z1," the emphasized character string 300 is displayed at a position (far side) away from the HMD 100 as compared to the emphasized character string 300 displayed at the coordinate "Z2."

The display control unit 156 displays the emphasized character string 300 alternately at the display position of the coordinate "Z1" and the display position of the coordinate "Z2" every certain time. The display control unit 156 changes the display state of the emphasized character string 300 in this manner, to thereby emphasize the display of the emphasized character string 300.

Figure 11:
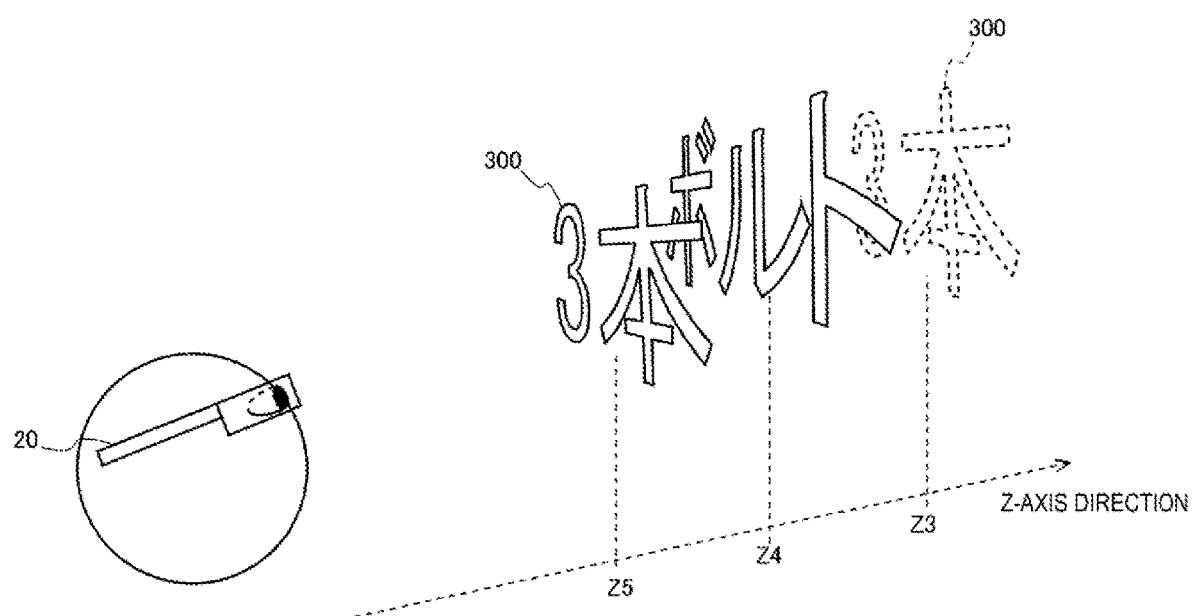
FIG. 11 is a view illustrating a display position of the character string in the Z axis direction.

FIG. 11 is a view illustrating a display position of the character string in the Z-axis direction. Particularly, in FIG. 11, there is illustrated a state in which the character string formed of two characters, a number and a Japanese Kanji character (Chinese character), meaning "three" being the emphasized character string 300 and another character string formed of three Japanese Katakana characters meaning "bolts" are displayed.

In FIG. 11, the other character string with three Katakana characters meaning "bolts" illustrated with the solid lines is displayed at a coordinate "Z4" in the Z-axis direction. In FIG. 11, the emphasized character string 300 illustrated with the broken lines is displayed at a coordinate "Z3" in the Z-axis direction, and the emphasized character string 300 illustrated with the solid lines are displayed at a coordinate "Z5" in the Z-axis direction. The coordinate "Z3" has a value larger than that of the coordinate "Z4," and the coordinate "Z4" has a value larger than that of the coordinate "Z5." That is, the emphasized character string 300 displayed at the coordinate "Z3" is displayed at a position (far side) away from the HMD 100 as compared to the other character string displayed at the coordinate "Z4." The emphasized character string 300 displayed at the coordinate "Z5" is displayed at a position (user side) close to the HMD 100 as compared to the other character string displayed at the coordinate "Z4."

The display control unit 156 displays the emphasized character string 300 alternately at the display position of the coordinate "Z3" and the display position of the coordinate "Z5" every certain time.

Figure 12A:
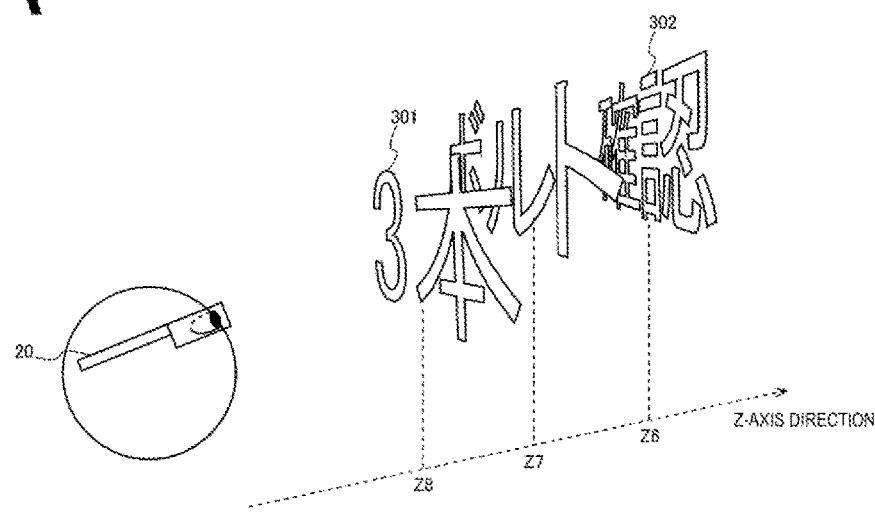
FIGS. 12A and 12B are views each illustrating a display position of the character string in the Z axis direction.

In FIG. 12A, the other character string "bolts" indicated with the solid lines is displayed at a coordinate "Z7" in the Z-axis direction. In FIG. 12A, the character string formed of the number and the Japanese Kanji character meaning "three" illustrated with the solid lines is a first emphasized character string 301, and is displayed at a coordinate "Z8." In FIG. 12A, a character string formed of two Kanji characters meaning "confirm" illustrated with the solid lines is a second emphasized character string 302, and is displayed at a coordinate "Z6." The first emphasized character string 301 corresponds to "first object" in the present invention, and the second emphasized character string 302 corresponds to "second object" in the present invention. The first emphasized character string 301, the second emphasized character string 302, and other character strings are displayed at positions not overlapping with each other in the Z-axis direction. The first emphasized character string 301, the second emphasized character string 302, and the other character strings are displayed at the positions not overlapping with each other in the Z-axis direction, and thus, degradation of visibility of information to be visually recognized by the user can be prevented.

Figure 12B:
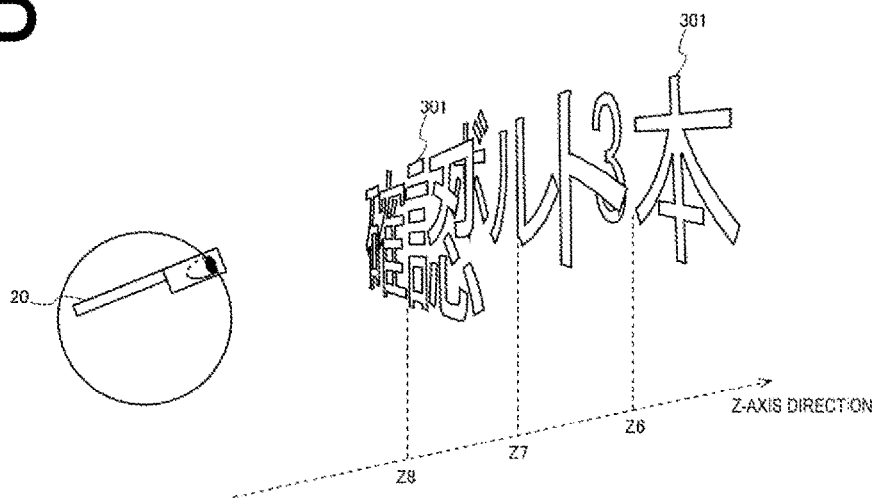

In FIGS. 12A and 12B, the coordinate "Z6" has a value larger than that of the coordinate "Z7," and the coordinate "Z7" has a value larger than that of the coordinate "Z8." In FIG. 12A, the second emphasized character string 302 with two Kanji characters meaning "confirm" displayed at the coordinate "Z6" is displayed at a position (far side) away from the HMD 100 as compared to the other character string with three Katakana characters meaning "bolts" displayed at the coordinate "Z7." In FIG. 12A, the first emphasized character string 301 with a number and a Kanji character meaning "three" displayed at the coordinate "Z8" is displayed at a position (user side) close to the HMD 100 as compared to the other character string with three katakana characters meaning "bolts" displayed at the coordinate "Z7."

In FIG. 12B, the character string with a number and a Kanji character meaning "three" being the first emphasized character string 301 is displayed at the coordinate "Z6" in the Z-axis direction, and the character string with two Kanji characters meaning "confirm" being the second emphasized character string 302 is displayed at the coordinate "Z8" in the Z-axis direction. In FIG. 12B, the other character string with three Katakana characters meaning "bolts" is displayed at the same coordinate "Z7" as illustrated in FIG. 12A.

In FIG. 12B, the first emphasized character string 301 with a number and a Kanji character meaning "three" displayed at the coordinate "Z6" is displayed at a position (far side) away from the HMD 100 as compared to the other character string with three Katakana characters meaning "bolts" displayed at the coordinate "Z7." In FIG. 12B, the second emphasized character string 302 with two Kanji characters meaning "confirm" displayed at the coordinate "Z8" is displayed at a position (user side) close to the HMD 100 as compared to the other character string with three Katakana characters meaning "bolts" displayed at the coordinate "Z7."

The display control unit 156 does not change the display position of the other character string with three Katakana characters meaning "bolts" in the Z-axis direction, and alternately changes the display positions of the first emphasized character string 301 and the second emphasized character string 302 every certain time. That is, the display control unit 156 controls the right display unit 22 and the left display unit 24 so that the state illustrated in FIG. 12A and the state illustrated in FIG. 12B are displayed alternately.

The display control unit 156 changes the display positions of the first emphasized character string 301 and the second emphasized character string 302 in this manner, to thereby emphasize the display of the first emphasized character string 301 and the second emphasized character string 302.

In FIG. 12A and FIG. 12B, the position at the coordinate "Z6" and the position at the coordinate "Z7" may be the same.

For example, in a case where the first emphasized character string 301 is displayed at a position nearer than the second emphasized character string 302, the second emphasized character string 302 may be displayed at the same display position as the display position of the other character string with three Katakana characters meaning "bolts." Similarly, in a case where the second emphasized character string 302 is displayed at a position nearer than the first emphasized character string 301, the first emphasized character string 301 may be displayed at the same display position as the display position of the other character string with three Katakana characters meaning "bolts."

Figure 13A:
FIGS. 13A to 13C are views each illustrating the emphasized character string displayed in the display region.
Figure 13B:
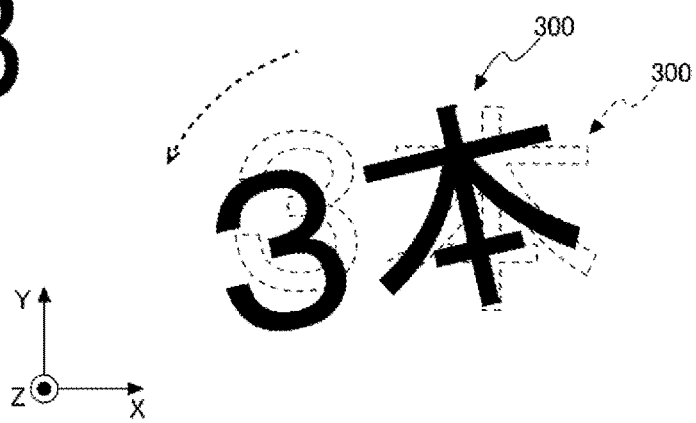
Figure 13C:
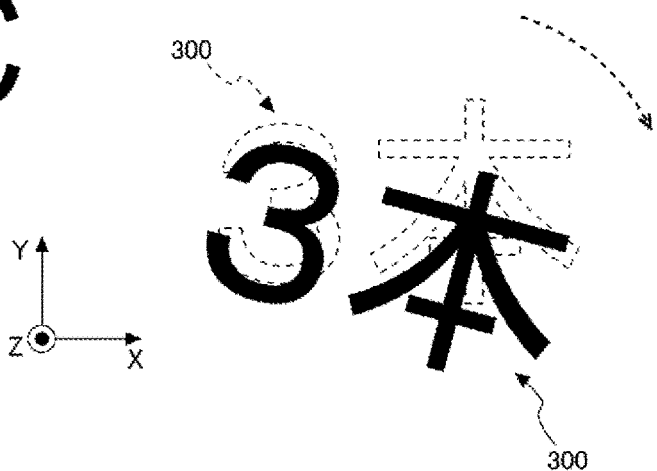

FIGS. 13A to 13C are views each illustrating the emphasized character string 300 displayed in the display region VR.

The display control unit 156 sets an imaginary axis, and causes the emphasized character string 300 to turn about the set imaginary axis. Specifically, the display control unit 156 switches the display position of the emphasized character string 300 for each certain time. Accordingly, the display control unit 156 causes the emphasized character string 300 to be displayed in the display region VR so that the emphasized character string 300 turns about the imaginary axis. The imaginary axis may be set in an arbitrary direction, and the direction may be the vertical direction, the horizontal direction, and an oblique direction as long as the user can visually recognize that the display position of the emphasized character string 300 is changed.

In FIGS. 13A to 13C, the following case is illustrated. That is, the imaginary axis is set in a direction parallel with the Z-axis direction being the direction of the line of sight of the user, and the display position of the emphasized character string 300 is changed by causing the emphasized character string 300 to turn about the set imaginary axis.

In FIG. 13A, the emphasized character string 300 before being changed in display position is illustrated. In FIG. 13B, there is illustrated a state in which the emphasized character string 300 is caused to turn in a counterclockwise direction (left turning) on the sheet of FIG. 13B. In FIG. 13C, there is illustrated a state in which the emphasized character string 300 is caused to turn in a clockwise direction (right turning) on the sheet in FIG. 13C.

The display control unit 156 changes the display of the emphasized character string 300 from the state in FIG. 13A to the state in FIG. 13B, and further returns the display from the state in FIG. 13B to the state in FIG. 13A. The display control unit 156 changes the display of the emphasized character string 300 from the state in FIG. 13A to the state in FIG. 13C, and further returns the display from the state in FIG. 13C to the state in FIG. 13A. The display control unit 156 changes the display position of the emphasized character string 300 as described above, and thus, the display of the emphasized character string 300 is emphasized.

Figure 14A:
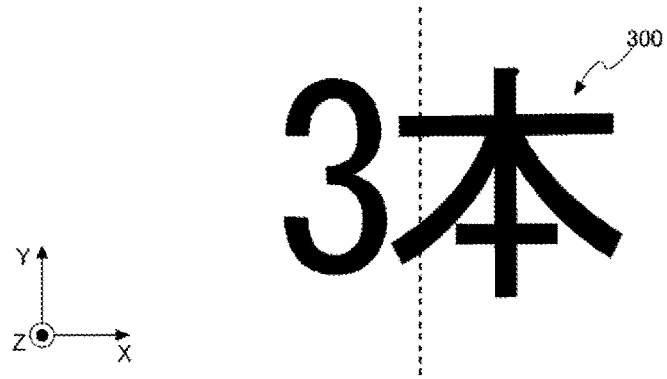
FIGS. 14A to 14C are views each illustrating the emphasized character string displayed in the display region.
Figure 14B:
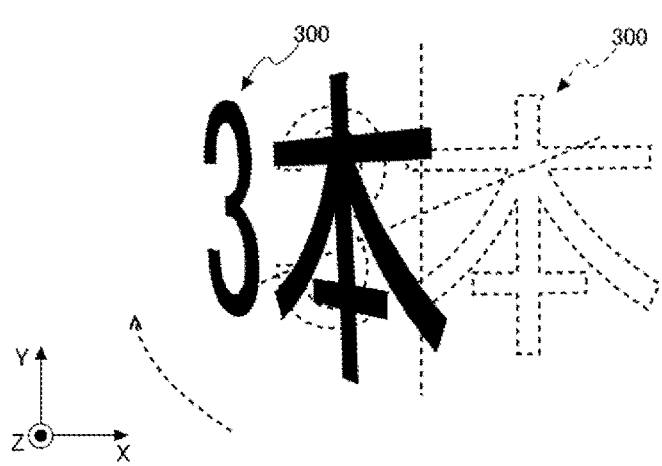
Figure 14C:
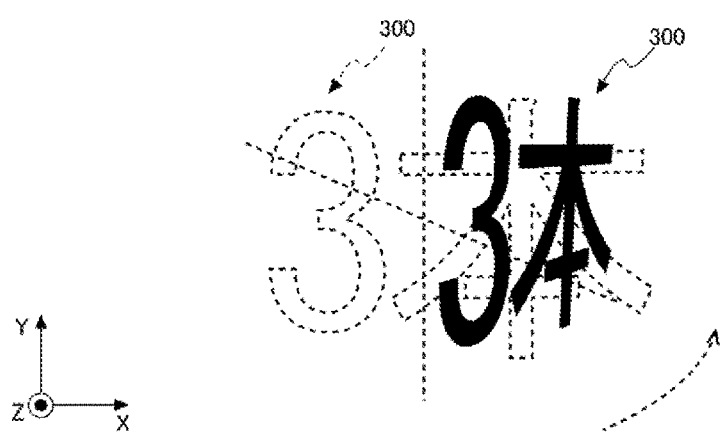

FIGS. 14A to 14C are views each illustrating the emphasized character string 300 displayed in the display region VR.

In FIGS. 14A to 14C, the following case is illustrated. That is, the imaginary axis is set in a direction parallel with the Y-axis direction being the vertical direction, and the emphasized character string 300 is caused to turn about the set imaginary axis.

In FIG. 14A, the emphasized character string 300 before being changed in display position is illustrated. In FIG. 14B, there is illustrated a state in which the emphasized character string 300 is caused to turn about the imaginary axis in a clockwise direction (right turning) on the sheet of FIG. 14B. In FIG. 14C, there is illustrated a state in which the emphasized character string 300 is caused to turn about the imaginary axis in a counterclockwise direction (left turning) on the sheet of FIG. 14C.

Regarding the state of the emphasized character string 300 illustrated in FIG. 14B, of the two characters meaning three being the emphasized character string 300, the position of the right Kanji character on the sheet of FIG. 14B in the Z-axis direction is displayed at a nearer position (user side) as compared to the left number "3" on the sheet in the Z-axis direction.

Regarding the state of the emphasized character string 300 illustrated in FIG. 14C, of the two characters meaning three being the emphasized character string 300, the position of the left number "3" on the sheet of FIG. 14C in the Z-axis direction is displayed at a nearer position (user side) as compared to the right Kanji character on the sheet in the Z-axis direction.

The display control unit 156 changes the display of the emphasized character string 300 from the state in FIG. 13A to the state in FIG. 13B, and further returns the display from the state in FIG. 13B to the state in FIG. 13A. The display control unit 156 changes the display of the emphasized character string 300 from the state in FIG. 13A to the state in FIG. 13C, and further returns the display from the state in FIG. 13C to the state in FIG. 13A. The display control unit 156 changes the display position of the emphasized character string 300 as described above, and thus, the display of the emphasized character string 300 is emphasized.

Figure 15A:
FIGS. 15A to 15C are views each illustrating the emphasized character string displayed in the display region.
Figure 15B:
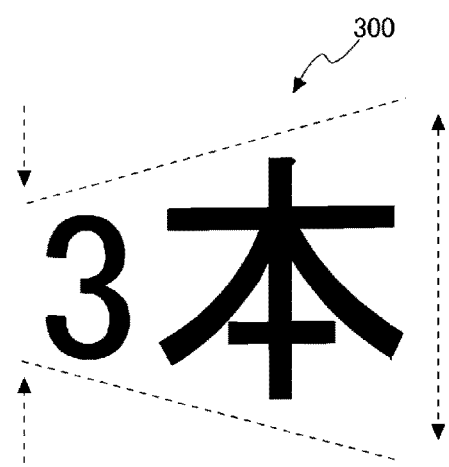
Figure 15C:
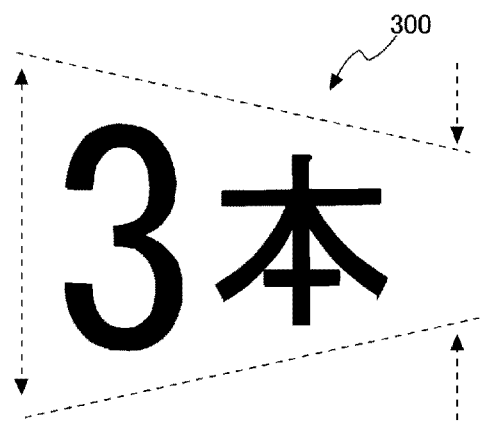

FIGS. 15A to 15C are views each illustrating the emphasized character string 300 displayed in the display region VR. FIGS. 15A to 15C are display examples in which a size (length) of one end and a size (length) of another end are changed.

In FIG. 15A, the emphasized character string 300 before being changed in size is illustrated. In FIG. 15B, there is illustrated a state in which a character size of the emphasized character string 300 is continuously reduced as approaching from the right end to the left side on the sheet of FIG. 15B.

In FIG. 15C, there is illustrated a state in which a size of the emphasized character string 300 is continuously reduced as approaching from the left end to the right side on the sheet of FIG. 15C.

The display control unit 156 changes the character size of the emphasized character string 300, to change the state from the state in FIG. 15A to the state in FIG. 15B. The display control unit 156 continuously returns the character size of the emphasized character string 300 which is changed to the state in FIG. 15B, to the state in FIG. 15A.

The display control unit 156 changes the character size of the emphasized character string 300 to change the state from the state in FIG. 15A to the state in FIG. 15C. The display control unit 156 continuously returns the character size of the emphasized character string 300 which is changed to the state in FIG. 15C, to the state in FIG. 15A. The display control unit 156 changes the display sizes of the right and left sides in the character string as described above. Accordingly, the display of the emphasized character string 300 is emphasized.

Figure 16A:
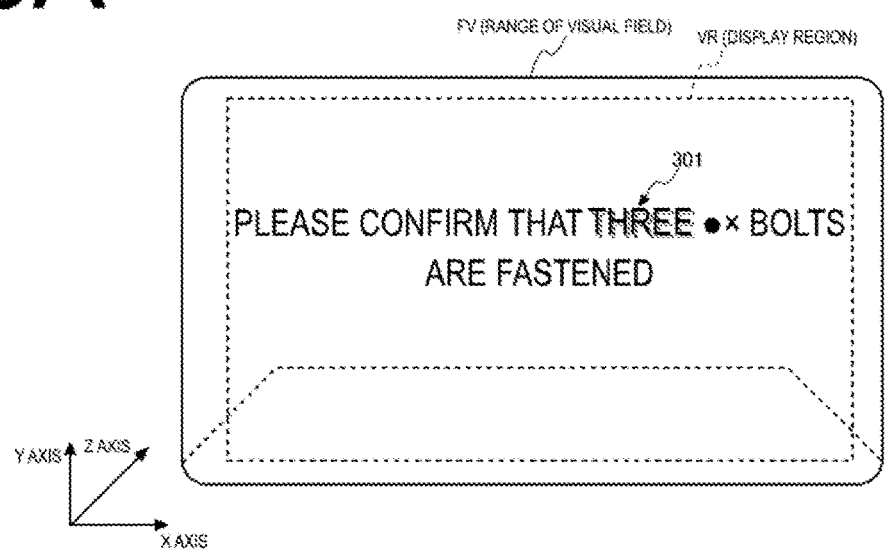
FIGS. 16A and 16B are views each illustrating the emphasized character string displayed in the display region.
Figure 16B:
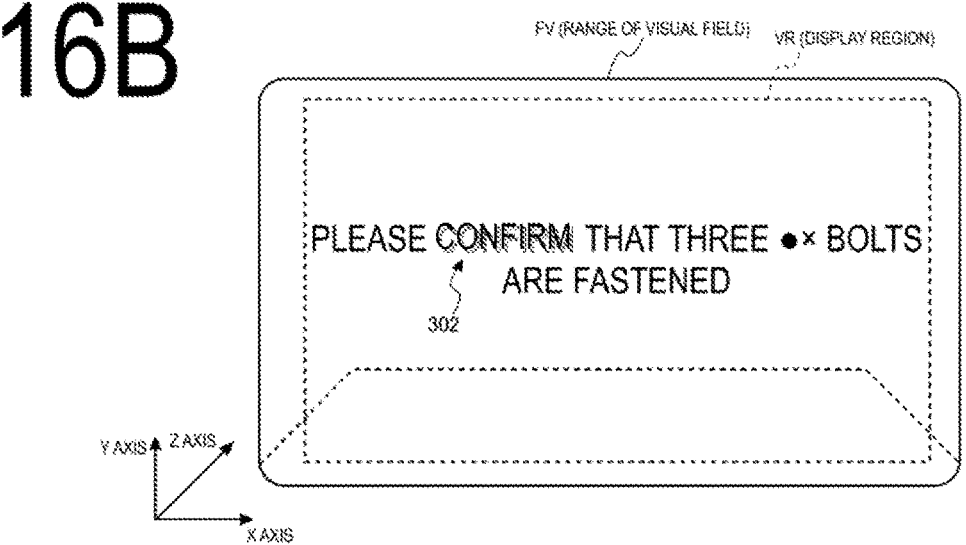

FIGS. 16A and 16B are views each illustrating the emphasized character string 300 displayed in the display region VR. Particularly, in FIGS. 16A and 16B, there is illustrated a case where two-character strings of "three" being the first emphasized character string 301 and "confirm" being the second emphasized character string 302 are selected as the emphasized character string 300.

In FIG. 16A, there is illustrated a state in which the display position of "three" being the first emphasized character string 301 in the Z-axis direction is at a nearer position (user side) than the other character string. In FIG. 16A, the display position of "confirm" being the second emphasized character string 302 in the Z-axis direction is the same as the display position of the other character string.

In FIG. 16B, there is illustrated a state in which the display position of "confirm" being the second emphasized character string 302 in the Z-axis direction is at a nearer position (user side) than the other character string. In FIG. 16B, the display position of "three" being the first emphasized character string 301 in the Z-axis direction is at the same display position of the other character string.

The display control unit 156 controls the right display unit 22 and the left display unit 24 so that the first emphasized character string 301 and the second emphasized character string 302 are alternately displayed at a nearer position (user side) than the other character string in the Z-axis direction for certain time.

The display control unit 156 changes the display positions of the first emphasized character string 301 and the second emphasized character string 302 in this manner, to thereby emphasize the display of the first emphasized character string 301 and the second emphasized character string 302.

Figure 17:
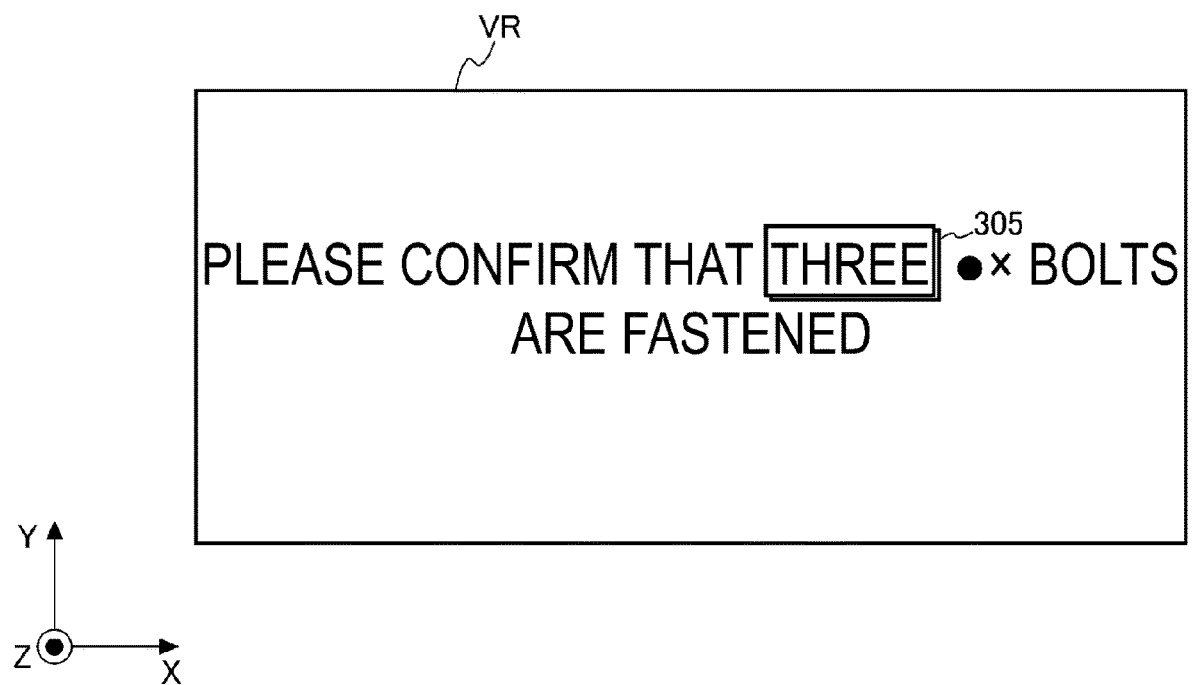
FIG. 17 is a view illustrating display of the display region.

FIG. 17 is a view for illustrating display of the display region VR. Particularly, in FIG. 17, there is illustrated a state in which a frame body 305 surrounds the emphasized character string 300.

In a case where the emphasized character string 300 is detected, the display control unit 156 surround the detected emphasized character string 300 with the frame body 305. The display control unit 156 changes the display position of the frame body 305 surrounding the emphasized character string 300 in the Z-axis direction every certain time. The display control unit 156 changes the display of the frame body 305 surrounding the emphasized character string 300 in this manner, to thereby emphasize the display of the emphasized character string 300. Note that, in FIG. 17, the frame body 305 surrounding characters is illustrated as the frame body 305. However, the object surrounded by the frame body 305 may include a symbol, a figure, a number, an icon, and a button. The frame body 305 may surround a plurality of kinds of objects such as a figure and a number.

Figure 18:
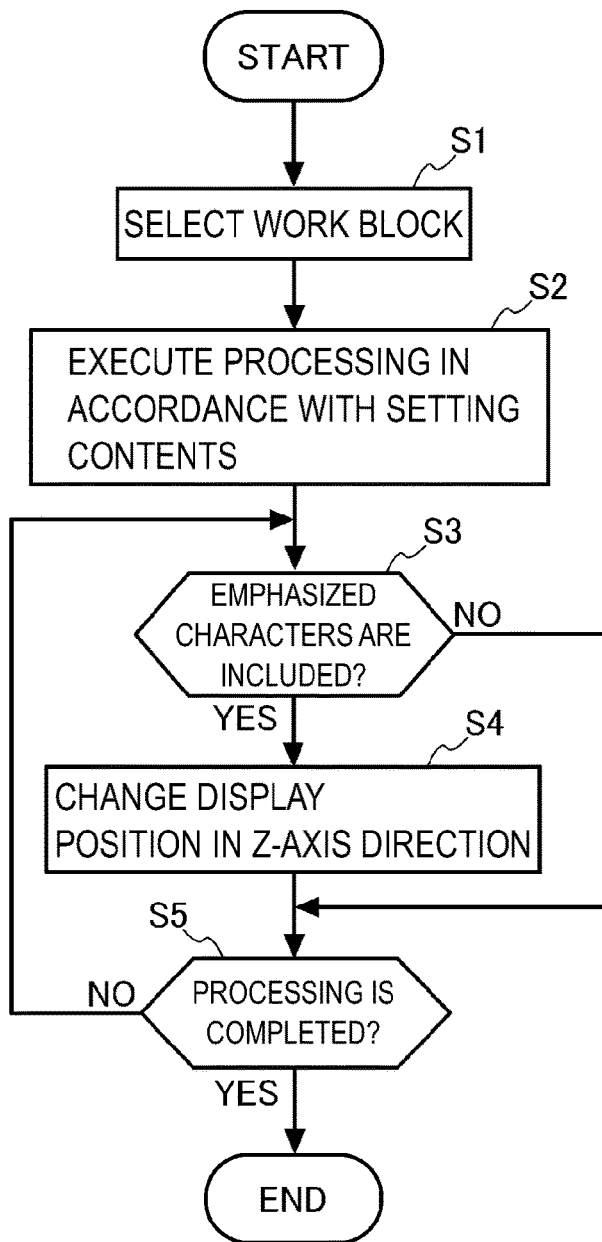
FIG. 18 is a flowchart illustrating an operation of a control unit.

FIG. 18 is a flowchart illustrating an operation of the control unit 150.

The control unit 150 reads the process flow data 162 from the storage unit 160, and executes the work blocks included in the process flow data 162. Specifically, the control unit 150 selects a work block to be executed in accordance with an order of execution included in the process flow data 162 (Step S1). Next, the control unit 150 executes processing in accordance with the setting content set in the selected work block (Step S2). At this time, the control unit 150 analyzes a document or an image to be displayed as information for the operator, and performs an operation of detecting the emphasized character string 300 set in the setting information. The control unit 150 determines whether the emphasized character string 300 is included in the document or the image to be displayed (Step S3).

In a case where it is determined that the emphasized character string 300 is included (Step S3/YES), the control unit 150 causes the image display unit 20 to display the document or the image to be displayed in the display region VR. Further, the control unit 150 changes the display position of the detected emphasized character string 300 in the Z-axis direction (Step S4). That is, the control unit 150 controls the display position of the emphasized character string 300 so that the display position of the detected emphasized character string 300 in the Z-axis direction is different from the display position of the other character string. After that, the control unit 150 determines whether the processing for entire selected work block is completed (Step S5). The determination on whether the processing of the work block is completed may be made by, for example, an operation received by the operation unit 110, or it may be determined that the process is completed in a case where the control unit 150 determines that all the process set in the work block is executed. In a case where it is determined that the processing for entire work block is not completed, the control unit 150 returns to Step S3 (Step S5/NO). The control unit 150 causes the image display unit 20 to display a document or an image to be newly displayed in the display region VR. In a case where the emphasized character string 300 is included in the displayed document or image, the control unit 150 changes the display position of the detected emphasized character string 300 in the Z-axis direction. In a case where it is determined that the processing for entire work block is completed (Step S5/YES), the control unit 150 terminates the process flow.

A method for displaying the emphasized character string 300 with more emphasis than the other character string is not limited to the above-mentioned method. For example, in a case where the emphasized character string 300 is displayed at a position closer to the HMD 100 than the other character string in the Z-axis direction, boldness of the emphasized character string 300 may be changed to be thicker than that of the other character string. In a case where the emphasized character string 300 is positioned at a position away from the HMD 100 than the other character string in the Z-axis direction, the boldness of the emphasized character string 300 may be changed to be thinner than that of the other character string.

The emphasized character string 300 may be displayed in a color different from a color of the other character string. The emphasized character string 300 may be displayed in different colors depending on a case where the emphasized character string 300 is displayed at a position closer to the HMD 100 than the other character string in the Z-axis direction and a case where the emphasized character string 300 is displayed at a position away from the HMD 100 than the other character string in the Z-axis direction.

The display of the emphasized character string 300 may be controlled so that at least one of a font type and a font size of the emphasized character string 300 and at least corresponding one of a font type and a font size of the other character string are different from each other.

Figure 19:
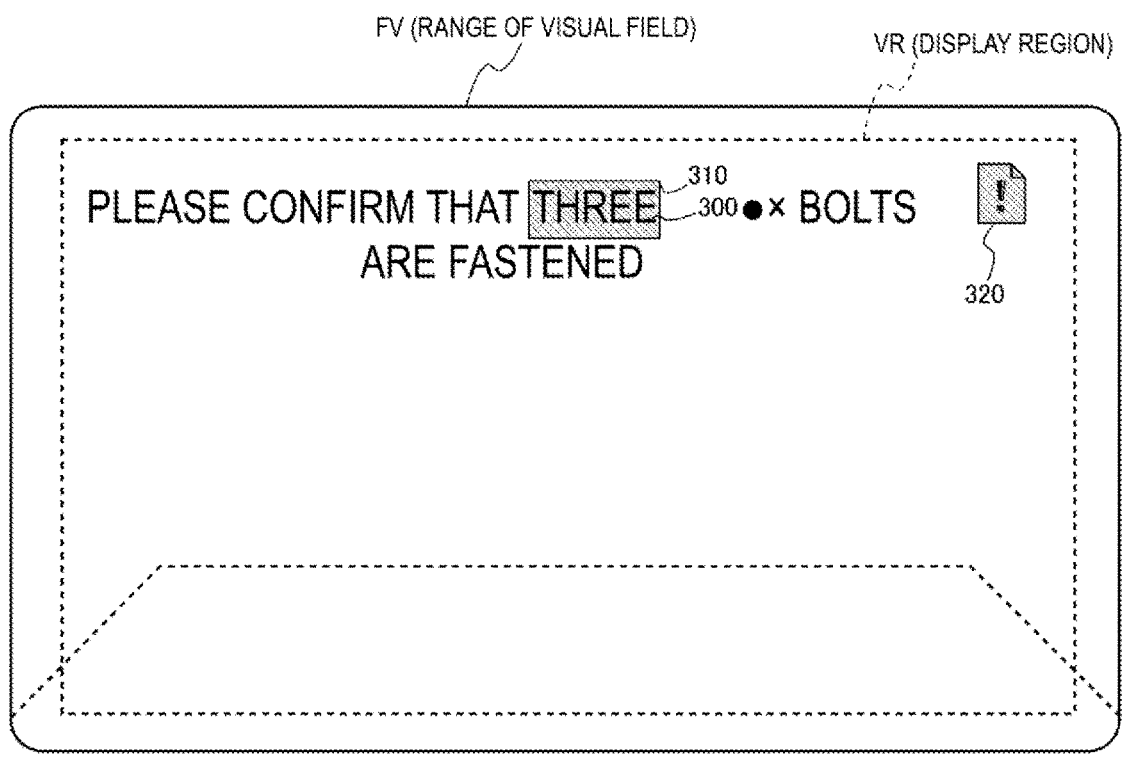
FIG. 19 is a view illustrating display of the display region.

FIG. 19 is a view illustrating a display example of the display region VR.

An image to be displayed in the display region VR by the display control unit 156 includes an icon 320 and a background image 310. In a case where the emphasized character string 300 is displayed in a color different from a color of the other character string, the display control unit 156 may display the icon 320 in the same color as that of the emphasized character string 300. The display control unit 156 may displays the background image 310 only for the emphasized character string 300. In a case where the background image 310 is displayed for the emphasized character string 300 and the other character string, the background image 310 for the emphasized character string 300 and the background image for the other character string may be displayed in different colors or patterns. The display control unit 156 may set the colors of the emphasized character string 300 and the background image 310 so that the color of the background image 310 and the color of the emphasized character string 300 are complementary.

With the above-mentioned display, the operator recognizes the emphasized character string 300 more easily.

The display of the icon 320 may be blinked to indicate that the emphasized character string 300 is included in the document or the image displayed in the display region VR.

The display in which the display position of the emphasized character string 300 is changed in the Z-axis direction and the display in which the display position of the icon 320 in the Z-axis direction may be performed at different timings. For example, while the display position of the emphasized character string 300 in the Z-axis direction is being changed, the display position of the icon 320 in the Z-axis direction is not changed. That is, the display position of the icon 320 is not changed. In a case where the display position of the icon 320 in the Z-axis direction is changed, the display position of the emphasized character string 300 in the Z-axis direction is not changed. Thus, the display position of one of the emphasized character string 300 and the icon 320 in the Z-axis direction is changed. Accordingly, it is possible to enhance an effect of allowing the inclusion of the emphasized character string 300 in the document or the image to be recognized.

In a case where the display position of the emphasized character string 300 in the Z-axis direction is changed, the display control unit 156 may also change the display position in the X axis direction and the Y axis direction.

For example, in a case where the emphasized character string 300 is displayed on a user side than the other character string, the display control unit 156 controls the display position of the emphasized character string 300 so that the emphasized character string 300 is displayed near the center of the display region VR. In a case where the emphasized character string 300 is displayed on a far side than the other character string, the display control unit 156 causes the emphasized character string 300 to be displayed at a position closer to a peripheral part in the display region VR as compared to the case where the emphasized character string 300 is displayed on a user side. That is, in a case where the display position of the emphasized character string 300 is changed from a far side to a user side than the other character string, the emphasized character string 300 is displayed so as to move from the peripheral part to the center part in the display region VR. In a case where the display position of the emphasized character string 300 is changed from a user side to a far side than the other character string, the emphasized character string 300 is displayed so as to move from the center part to the peripheral part in the display region VR.

As described above, in the exemplary embodiment, the HMD 100 through which outside scenery can be visually recognized includes the image display unit 20, the storage unit 160, and the control unit 150.

The image display unit 20 is configured to display objects in the display region VR overlapping with the outside scenery.

The storage unit 160 is configured to store the process flow data 162 as selection information to be used for selecting the objects to be displayed in the display region VR.

The control unit 150 is configured to select any of the objects to be displayed in the display region VR. based on the setting information included in the process flow data 162, and to control display positions of the objects in the depth direction of the display region VR so that a display position of the selected object is different from a display position of another object to be displayed in the display region.

Thus, an oversight of the objects can be reduced, and the information displayed by the HMD 100 can effectively be utilized.

The control unit 150 adjusts the display positions of the objects in the depth direction by changing a convergence angle between the right eye and the left eye of the user.

Therefore, the display positions of the objects in the depth direction can easily be adjusted.

The control unit 150 controls the display positions of the objects in the depth direction of the display region VR and the display states of the objects.

Thus, an oversight of the object is further reduced, and the information displayed by the HMD 100 can effectively be utilized.

The control unit 150 changes the display position of the selected object in the depth direction every unit time.

Thus, an oversight of the object is further reduced, and the information displayed by the HMD 100 can effectively be utilized.

The control unit 150 changes a display state every unit time between a state in which the selected object is displayed on a user side than another object in the depth direction and a state in which the selected object is displayed on a far side than another object in the depth direction.

Thus, an oversight of the object is further reduced, and the information displayed by the HMD 100 can effectively be utilized.

The control unit 150 changes the display position of the selected object about an imaginary axis set in a predetermined direction with the display region VR as a reference.

Thus, an oversight of the object is further reduced, and the information displayed by the HMD 100 can effectively be utilized.

The control unit 150 sets the imaginary axis to a direction parallel with the vertical direction of the display region VR. The control unit 150 alternately switches the following two display states every unit time. In one display state, one end of the selected object in a direction parallel with the horizontal direction of the display region VR is displayed on a user side in the depth direction than another end of the selected object in the direction parallel with the horizontal direction of the display region VR. In the other display state, the other end is displayed on a user side in the depth direction than the one end.

Thus, an oversight of the object is further reduced, and the information displayed by the HMD 100 can effectively be utilized.

The control unit 150 alternately switches the following two display states every unit time. In one display state, a length of the selected object on the one end side is shorter than a length of the selected object on the other end side. In another display state, the length of the selected object on the other end side is shorter than the length of the selected object on the one end side.

Thus, an oversight of the object is further reduced, and the information displayed by the HMD 100 can effectively be utilized.

In a case where a character string is selected as an object, the control unit 150 causes the selected character string and the other character string to be different in at least any of a color, boldness, a background color, a font type, and a font size.

Therefore, the user can recognize the character string easily, and an oversight of the information needed for the user can further be reduced with the HMD 100. Thus, the information displayed by the HMD 100 can effectively be utilized.

The storage unit 160 stores control data for defining an operation flow including a plurality of operation steps for which an order of execution is set in advance.

In a case where the operation flow is executed, the control unit 150 switches whether or not to execute control of the display position of the object in accordance with the setting of the control data regarding the operation steps.

Therefore, the user can recognize the object more easily, and an oversight can further be reduced. Therefore, in a case of using the HMD 100 for work support, work of the user can effectively be supported.

In a case where a plurality of objects are selected, the control unit 150 causes the plurality of selected objects to be sequentially displayed in the display region VR.

Therefore, even when the plurality of objects are selected, an oversight of the objects can be reduced, and the information displayed by the HMD 100 can effectively be utilized.

In a case where the first emphasized character string 301 and the second emphasized character string 302 are selected as the plurality of objects, the control unit 150 switches a display state between a first display state and a second display state.

In the first display state, in the depth direction, the first emphasized character string 301 is displayed on a user side than another object, and the second emphasized character string 302 is displayed on a far side than another object. In the second display state, in the depth direction, the second emphasized character string 302 is displayed on a user side than the other object, and the first emphasized character string 301 is displayed on a far side than the other object.

Therefore, even when the plurality of objects are selected, an oversight of the objects can be reduced, and the information displayed by the HMD 100 can effectively be utilized.

The control unit 150 controls the display position of the selected object in the display region VR so that the selected object does not overlap with another object.

Thus, degradation of visibility of the plurality of objects can be prevented.

The control unit 150 selects an object including any of a character, the icon 320, and the frame body 305 surrounding at least any of the character and the icon 320.

Therefore, in a case where any of the character, the icon 320, and the frame body 305 is displayed by the HMD 100, an oversight of the objects can be reduced, and the information displayed by the HMD 100 can effectively be utilized.

The above-mentioned exemplary embodiment is a preferred exemplary embodiment of the present invention. However, the exemplary embodiment is not limited thereto, and can be modified in various manners without departing from the scope of the present invention.

For example, in the above-mentioned exemplary embodiment, the transmissive HMD 100 is exemplified for description. However, the HMD 100 may be a non-transmissive head-mounted type display device through which outside scenery cannot be visually recognized. The present invention is applicable to a device as long as the device can change a display position in a depth direction of a display region. For example, examples of the device to which the present invention is applicable include a personal computer (PC), a tablet PC, a smart phone, a projector, and the like.

The HMD 100 may include an interface (not illustrated) for coupling various external devices being supply sources of contents. For example, the interface may be an interface for a wired connection, such as a USB interface, a micro USB interface, and an interface for a memory card, or may be a wireless communication interface. The external device in this case is an image supply device supplying an image to the HMD 100, and may be a personal computer (PC), a portable phone terminal, a portable game machine, or the like. In this case, the HMD 100 can output an image or sound based on the content data 163 input from such external device.

In the above-mentioned exemplary embodiment, a configuration in which the control device 10 is coupled to the image display unit 20 via a wire is exemplified, but the present invention is not limited thereto. The image display unit 20 may be coupled to the control device 10 wirelessly. As a wireless communication method in this case, the method exemplified as the communication method for the communication unit 117 may be employed, and other communication methods may be employed.

Part of the function of the control device 10 may be provided in the image display unit 20, and the control device 10 may be achieved by a plurality of devices. That is, the control device 10 is not limited to the configuration including the case 10A having a box shape. For example, in place of the control device 10, the body of the user, clothes of the user, or a device that is wearable by the user may be used. The device that is wearable by the user may be, for example, a watch-type device, a ring-type device, a laser pointer, a mouse, an air mouse, a game controller, a pen-type device, and the like.

Further, in the above-mentioned exemplary embodiment, a configuration in which the image display unit 20 and the control device 10 are separated and coupled via the coupling cable 40 is exemplified. The present invention is not limited thereto. The control device 10 and the image display unit 20 may be integrated to be mounted on the user's head.

As the control device 10, a notebook-type computer, a tablet-type computer, or a desktop-type computer may be used. As the control device 10, a portable electronic device including a game machine, a portable phone terminal, a smart phone, and a portable media player, and other dedicated devices may be used.

For example, in place of the image display unit 20, an image display unit using another method such as an image display unit worn like a hat may be employed. Such an image display unit is only required to include a display unit corresponding to the left eye LE of the user and displaying an image, and a display unit corresponding to the right eye RE of the user and displaying an image. In place of the image display unit 20, a head-up display may be used. According to this configuration, the display device can be mounted on a vehicle such as an automobile and an airplane. For example, in a case where the head-up display is mounted in a vehicle, an operation surface corresponding to the operation surface of the track pad 14 is provided to a steering wheel or the like of a vehicle.

For example, the head-mounted type display device may be embedded in a body protector such as a helmet. In this case, it may be assumed that positions corresponding to a body of a user are positioning portions, and portions that are positioned for the portions are mounted portions.

As the optical system for guiding the image light to the eyes of the user, a configuration in which a virtual image is formed in a part of the right light guiding plate 26 and the left light guiding plate 28 by the half mirrors 261 and 281 is exemplified. The present invention is not limited thereto, and an image maybe displayed in the display region with area of the entire part or the most part of the right light guiding plate 26 and the left light guiding plate 28. In this case, in the operation for changing the display position of the image, process for reducing an image size may be included.

The optical elements of the present invention are not limited to the right light guiding plate 26 and the left light guiding plate 28 including the half mirrors 261 and 281, and are only required to be optical components causing the image light to enter the eyes of the user. Specifically, a diffraction grating, a prism, and a holographic display unit may be used.

At least part of the function blocks illustrated in FIG. 4 and FIG. 5 may be achieved by hardware, may be a configuration achieved by cooperation of hardware and software, and is not limited to the configuration in which the independent hardware resources are arranged as illustrated in the drawings. The program executed by the control unit 150 may be stored in other storage devices (not illustrated) in the non-volatile storage unit 123 or the control device 10. A program stored in an external device may be acquired via the communication unit 117 or the external connector 184 and executed. As a configuration formed in the control device 10, the operation unit 110 may be formed as a user interface (UI).

A unit of processing in the flowchart illustrated in FIG. 18 is obtained by dividing the processing of the control unit 150 of the HMD 100 according to the main processing contents for easy understanding. Thus, the present invention is not limited by a method of division into the unit of processing or a name of the unit of processing. The processing of the control unit 150 may be divided into a larger number of units of processing depending on the processing contents, or may be divided so that one unit of processing includes more processing contents. An order of processing in the above-mentioned flowchart is not limited to the illustrated example.

The entire disclosure of Japanese Patent Application No. 2017-239265, filed Dec. 14, 2017 is expressly incorporated by reference herein.

What is claimed is:

1. A head-mounted type display device comprising:
a display configured to display a character string in a display region overlapping with outside scenery which is visible through the head-mounted display device; and
a processor programmed to control a display position of the character string, wherein
the character string includes a first character and a second character,
a display position of the first character is different from a display position of the second character in a depth direction of the display region, and
the first character is aligned in a horizontal direction in the display region of the display with the second character.

2. The head-mounted type display device according to claim 1, wherein each of the first character and the second character is a character string.

3. The head-mounted type display device according to claim 1, wherein the processor is programmed to change the display position of the first character in the depth direction every unit time.

4. The head-mounted type display device according to claim 3, wherein
the processor is programmed to alternately switch the display position of the first character every unit time between a user side relative to the second character and a far side relative to the second character in the depth direction.

5. The head-mounted type display device according to claim 1, wherein the processor is programmed to change the display position of the first character about an imaginary axis set in a predetermined direction with the display region as a reference.

6. The head-mounted type display device according to claim 5,
wherein the processor is programmed to set the imaginary axis in a direction parallel with a vertical direction of the display region, and
the processor is programmed to alternately switch the display position of the first character every unit time between (i) a display position in which one end of the first character in a direction parallel with the horizontal direction of the display region is displayed on a user side relative to another end of the first character in the direction parallel with the horizontal direction of the display region and (ii) a display position in which the other end is displayed on the user side relative to the one end in the depth direction.

7. The head-mounted type display device according to claim 6, wherein the processor is configured to alternately switch a display state of the first character every unit time between (i) a display state in which a length of the one end is shorter than a length of the other end and (ii) a display state in which the length of the other end is shorter than the length of the one end.

8. The head-mounted type display device according to claim 2, wherein, the processor is configured to change the display state of the first character so that at least any of a color, boldness, a background color, a font type, and a font size of the character string as the first character and at least a corresponding one of a color, boldness, a background color, a font type, and a font size of the character string of the second character are different from each other.

9. The head-mounted type display device according to claim 1, wherein the processor is configured to control the display position of the first character in the display region so that the first character does not overlap with the second character.

10. The head-mounted type display device according to claim 1, wherein the character string is one linear sequence of characters that includes the first character and the second character.

11. The head-mounted type display device according to claim 5, wherein the first character and the second character are rotated about the imaginary axis in order to change the display positions of the first and second characters.

12. A method of controlling a head-mounted type display device, the method comprising:
  controlling a display position of a character string displayed in a display region overlapping with outside scenery which is visible through the head-mounted display device, wherein
  the character string includes a first character and a second character,
  a display position of the first character is different from a display position of the second character in a depth direction of the display region, and
  the first character is aligned in a horizontal direction in the display region of the display with the second character.

* * * * *